(12) United States Patent  
Balko et al.

(10) Patent No.: US 8,949,736 B2  
(45) Date of Patent: Feb. 3, 2015

(54) SYSTEM AND METHOD FOR IMMERSIVE PROCESS DESIGN COLLABORATION ON MOBILE DEVICES

(75) Inventors: Soeren Balko, Weinheim (DE); Kathrin Julia Fleischmann, Schwetzingen (DE); Alexander Dreiling, Kelvin Grove (AU)

(73) Assignee: SAP SE, Walldorf (DE)

( * ) Notice: Subject to any disclaimer, the term of this patent is extended or adjusted under 35 U.S.C. 154(b) by 198 days.

(21) Appl. No.: 12/905,585

(22) Filed: Oct. 15, 2010

(65) Prior Publication Data

US 2012/0096394 A1 Apr. 19, 2012

(51) Int. Cl.
G06F 3/048 (2013.01)
G06F 3/0488 (2013.01)
G06F 3/0482 (2013.01)
G06F 17/24 (2006.01)
G06Q 10/06 (2012.01)

(52) U.S. Cl.
CPC ............ G06F 3/0488 (2013.01); G06F 3/0482 (2013.01); G06F 17/24 (2013.01); G06Q 10/067 (2013.01)
USPC .......................................................... 715/790

(58) Field of Classification Search
USPC .......................................................... 715/790
See application file for complete search history.

(56) References Cited

U.S. PATENT DOCUMENTS 7,831,453 B2 * 11/2010 Das et al. ...................... 705/7.27
8,140,990 B2 * 3/2012 Pedersen et al. .............. 715/764
2002/0010718 A1 * 1/2002 Miller ............................ 707/526
2005/0289482 A1 * 12/2005 Anthony et al. ............... 715/851
2008/0165152 A1 * 7/2008 Forstall et al. ................ 345/173
2008/0307364 A1 * 12/2008 Chaudhri et al. ............. 715/836
2009/0172532 A1 * 7/2009 Chaudhri ...................... 715/702
2009/0204526 A1 * 8/2009 Wellons et al. ................. 705/35
2009/0307086 A1 * 12/2009 Adams et al. .............. 705/14.49
2011/0291945 A1 * 12/2011 Ewing et al. .................. 345/173
2011/0296351 A1 * 12/2011 Ewing et al. .................. 715/841

OTHER PUBLICATIONS

Hierarchical Clustering of business process models, Jung et al. ICIC interational Dec. 12, 2009. 11 pages.*
Collaborative business process modeling on the Web (SAP Gravity, pub/wlg/15618), http://scn.sap.com/people/alexander.dreiling/blog/2009/09/02/gravity-collaborative-busin . . . retrieved Dec. 12, 2013, pp. 1-2.
Cover Flow style animation (Apple, http://en.wikipedia.org/wiki/Cover_Flow) http://web.archive.org/web/20100718040212/http://en.wikipedia.org/wiki/Cover_flow, retrieved Dec. 12, 2013, pp. 1-2.

(Continued)

*Primary Examiner* — William Bashore
*Assistant Examiner* — Hien Duong
(74) *Attorney, Agent, or Firm* — Kenyon & Kenyon LLP

(57) ABSTRACT

Embodiments of the present invention may provide a method for presenting a design model on a computing device. The method may comprise using a computer processor to identify relationships among a plurality of model entities of the design model, to present a model view area to display a selected view of the design model on a display area of the computing device; and to present a view switch containing a plurality of view options. The plurality of view options may include a shape flow view. In the shape flow view, the model view area may display a detailed view of a model entity currently in focus and symbol(s) representing neighboring model entities in horizontal and/or vertical directions.

33 Claims, 18 Drawing Sheets

(56) References Cited

OTHER PUBLICATIONS

Clustering algorithms (k-means clustering, http://en.wikipedia.org/wiki/K-means_clustering) http://web.archive.org/web/20101008132739/http://en.wikipedia.org/wiki/K-means_clust . . . retreived Dec. 12, 2013, pp. 1-6.

BPMN (OMG, http://www.bpmn.org), http://web.archive.org/web/20101011103316/http://www.bpmn.org, retrieved Dec. 12, 2013, pp. 1-2.

Operational Transformation (http://en.wikipedia.org/wiki/Operational_transformation), http://web.archive.org/web/20100518122208/http://en.wikipedia.org/wiki/Operational_tra . . . retrieved Dec. 12, 2013, pp. 1-9.

* cited by examiner

SYSTEM AND METHOD FOR IMMERSIVE PROCESS DESIGN COLLABORATION ON MOBILE DEVICES

FIELD

The disclosed subject matter relates to the field of process design software applications and, more particularly, to a system and method for providing a process design collaboration on mobile devices.

BACKGROUND

Business process design is a highly collaborative task that requires different expert skills such as understanding the problem domain at hand, knowing modeling languages (e.g., Business Process Modelling Notation (BPMN), UML sequence diagrams and event-driven process chains (EPC)), having an overview onto the underlying IT landscape, being familiar with the organization's strategic goals, knowing the process' surrounding conditions and constraints, etc. In essence, a number of people need to contribute their expertise to model or to re-engineer a business process. Those contributors may both (1) assume different functional roles within one organization (such as business analysts, domain experts, IT professionals, etc.) or (2) be representatives of different organizations within a full-blown network orchestration scenario where multiple business partners need to collaborate and the process stretches beyond organizational boundaries.

Information technology has been assisting the business process design collaboration. For example, web-based tools have been developed that allow multiple geographically dispersed people to jointly create and change a process model at the same time using desktop computers or laptops. Each contributor sees the other peoples' changes in near real-time, thus eliminating the need to work on separate copies of the model. The key advantage of this approach over working on different model copies is that each contributor immediately sees other people's changes while still being able to work independently without being blocked by someone else's changes. Apart from that, the tedious job of sorting out contradictions among contributions from different people and possibly having to fill gaps in a manual merging step is completely avoided. However, the existing IT tools do not provide the proper support for the initial phases of collaborative process design projects.

The process design initiatives are often kicked off by letting the involved people meet face to face and discuss over approaches, goals, and scope. This is often necessary as many people with different functional background need to collaborate. Usually, brainstorming sessions are conducted where participants write down their thoughts on paper notes that are stuck on a whiteboard. There, they may be clustered (e.g., by sticking them close to other notes expressing similar ideas), prioritized (e.g., by putting them on top of or above others), possibly withdrawn (e.g., removed from the whiteboard), commented (e.g., by writing on the whiteboard with a board marker), mutually associated (e.g., by drawing arrows between the notes), etc.

After some discussion, the team of experts will ultimately come to a conclusion that is documented on the white board. The paper notes themselves, their arrangement and the associated drawings usually make up a rough initial process model. In some cases, the team may have even sketched a proper process model using notations like BPMN. Although that model typically lacks details and needs to be refined and revised in later stages, it is still worth to be preserved in order to not lose any findings or decisions made during the meeting. Usually, someone from the team needs to take notes on a laptop computer or take a photo (like by using his or her mobile phone) of the white board itself. In the former case, that person will not only have a hard time typing down all the information that is written on the whiteboard but he or she will (deliberately or not) also filter out or condense the information from a personal perspective. In the latter case (where someone takes a photo of the paper-based notes stuck on a white board), that photo is almost useless when it comes to really start designing a process that needs to start over from scratch. This is because a photo merely captures "analogous" information where much of the meta data (like who has added which note) is lost. Further, text written on the paper notes or directly on the white board is merely captured on the photo and not readily available in digital form. Optical character recognition may be error-prone (due to the handwriting) and may not even be feasible at all.

People typically refrain from using existing web-based collaboration tools during initial process design meetings. This is not only because it feels un-natural to focus on interacting with a Web site displayed on a browser rather than talking to one another, but mainly due to small screen restrictions, the mobile devices such as personal digital assistants (PDAs), smartphones may only be able to show a small portion of the process model at a time. Although laptops provide certain mobility to members of a collaborative design team, the requirement of all attendees to carry around laptops or have access to large screen devices (e.g., desktop computers) for collaboration on a design is still too restrictive.

In today's world, ubiquitous mobile devices provide the most mobility. Accordingly, a need exists for a method and system for providing collaborative process modeling to mobile devices.

DETAILED DESCRIPTION

Figure 1:
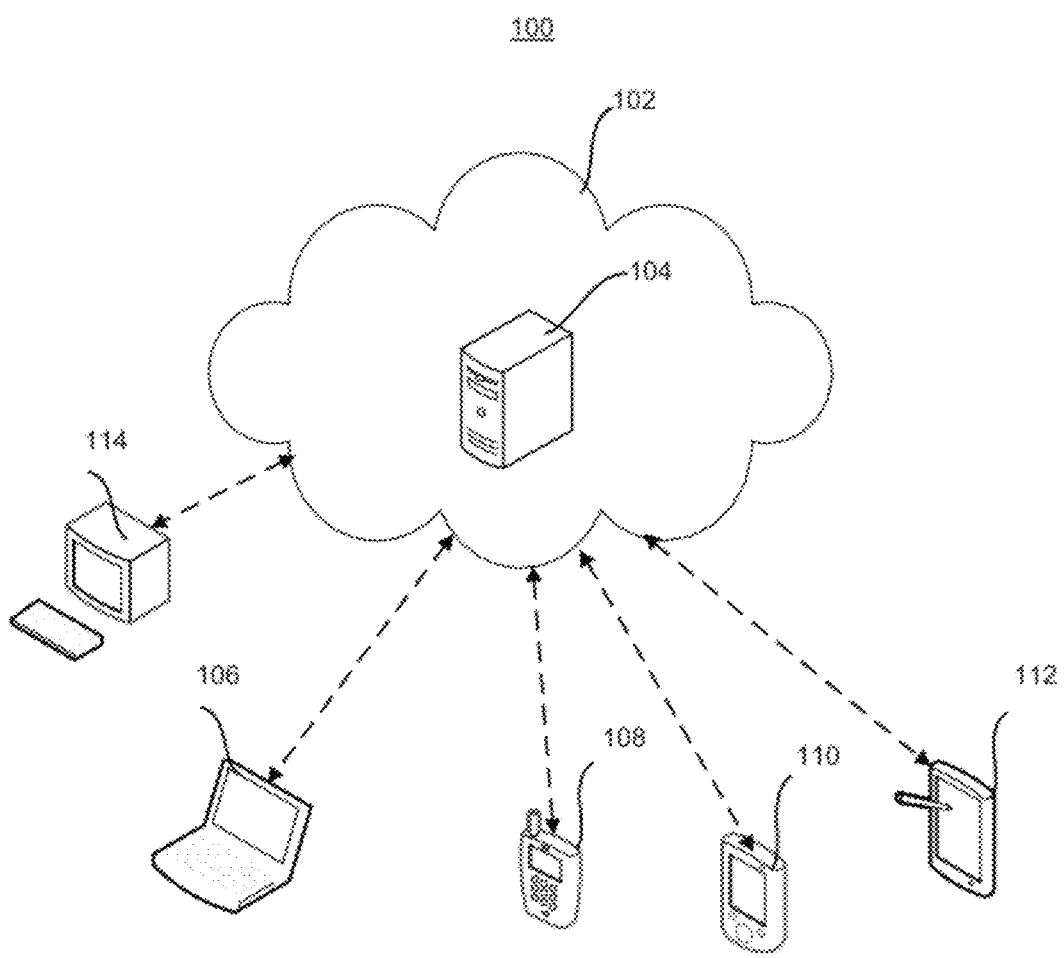
FIG. 1 illustrates a high level architecture of an exemplary system according to an embodiment.

Embodiments of the present invention may provide a method for presenting a design model on a computing device. The method may comprise using a computer processor to identify relationships among a plurality of model entities of the design model, to present a model view area to display a selected view of the design model on a display area of the computing device; and to present a view switch containing a plurality of view options. The plurality of view options may include a shape flow view. In the shape flow view, the model view area may display a detailed view of a model entity currently in focus and symbol(s) representing neighboring model entities in horizontal and/or vertical directions.

Embodiment of the present invention may extend the reach of modeling projects (notably business process modeling) to (1) users of mobile devices and (2) project stages beyond modeling, such as, initial brainstorming phases happening in face-to-face meetings, and other stages (e.g., process analysis, review and signoff) involving users at off-site locations without access to stationary computers offering a full-screen rendering of the process model) (e.g., at a customer facility, or in transit).

In one embodiment, a visualization of models based on directed graphs of attributed notes (e.g., business process diagrams, collections of notes, etc.) may be provided on a small screen for a mobile device. The visualization may take the limited rendering space into account while still providing for ways to explore and unambiguously understand the full model. In addition to visualization of models and model entities, the embodiment may also provide user interaction patterns for browsing and altering the model, based on techniques commonly used on mobile devices (e.g., touch gestures, tilt and movement tracking, voice command). Further, the embodiment may be plugged into an existing infrastructure for collaborative process modeling (e.g., a web based collaborative process design tool). As a result, users may use a diverse variety of tools (e.g., mobile clients including smart phone, pad computer, PDA or the like, or stationary devices including desktop PCs having a Web browser installed) while working on a design model.

In one embodiment, the mobile clients may interaction with a collaboration server that may be jointly used with stationary (Web-based) clients. Mobile clients may interact with the collaboration server through standard Web protocols (e.g., HTTP, WebSockets) atop wired or wireless connections (e.g., Wi-Fi, Bluetooth, LAN, WAN or cell phone connections). In addition, mobile clients may re-use portions of the client code for stationary clients, thus significantly reducing the total cost of development (TCD). The re-used client code may be, for example, lower level code underneath the UI logic level that takes care of interacting with the collaboration server and synchronizing a local model replica to the central model copy (which may be held and maintained by the collaboration server).

Moreover, embodiments of the present invention may provides for a number of visualization and user-interaction (browsing, editing) methods that both fit to a small screen and the means of operate a mobile device. For example, one exemplary implementation may designate three distinct ways a model can be visualized and interacted with: (1) a list of model entities (e.g., BPMN shapes) that are grouped and ordered by changeable, custom criteria (e.g., order by label, creation date, etc.; group by author, entity type, proximity clusters, etc.); (2) a visualization of the entire model (or a subset) by rendering a downscaled diagram and additionally providing for zoom-in/zoom-out capabilities; and (3) a full-screen visualization of single model entities (or groups of model entities aggregated on a single screen such as a BPMN shape plus comments and attachments that belong to that shape) where motions gestures (e.g., swipes) allow for navigating to neighboring entities (where the neighboring relation can take node associations or shape proximity into account).

Further, embodiment of the present invention may offer added-value collaboration features, for example, to invite modeling project participants by sending emails or giving phone calls to other people; and to capture data from built-in sensors (camera, GPS unit, microphone, etc.) and applications (e.g., Web browser, email client, etc.) which can be attached to a model. In one embodiment, users may take photos of some physical infrastructure that is referred to in the model (e.g., a manufacturing line that performs a task in a business process) and store the photos with the model (e.g., attached to a model entity).

FIG. 1 illustrates a high level architecture of an exemplary system 100 according to an embodiment. The exemplary system 100 may comprise a collaboration server 104 and a plurality of client devices. The plurality of client devices may include traditional computers, such as a laptop 106 and a desktop computer 114. The plurality of client devices may also include mobile devices, such as, a PDA 108, a smart phone 110, a pad device 112. The collaboration server 104 may be located in a computing "cloud" 102 (e.g., a server on the Internet). The plurality of client devices may be connected to the collaboration server 104 using a variety of wired and wireless technologies (e.g., LAN, WAN, Wi-Fi, Bluetooth, cell phone connection).

The collaboration server 104 may serve as a repository for a collaborative design process. For example, the collaboration server 104 may provide a backend storage where a central model (e.g., a BPMN diagram, a collection of virtual paper notes, or any other kind of structured information that can be mapped onto a directed graph of attributed notes) may be held. The collaboration server 104 may coordinate a dynamic number of clients (mobile and stationary devices that are used by participants in the collaboration project) by using a synchronization approach based on a known mechanism (e.g., Operational Transformation). For example, each of the plurality of client devices (e.g., the PDA 108, the smart phone 110, the pad device 112) may have a local replica of the central model and may independently perform changes to their respective local model replicas. That is, each client may hold a local copy of the model upon which may perform its changes. Those changes may happen in an asynchronous, non-blocking manner. When a client device sends changes made locally to the collaboration server 104, the collaboration server 104 may (1) check incoming changes against changes of other clients before they can be applied to the central model, which may entail transforming the operations against changes that have come in from other clients (if needed) or rejecting them altogether (if they are contradicting changes of another client), (2) apply them to the central model, and (3) broadcast them to the other clients which may apply them to their local models.

Although the plurality of client devices may include a variety of physical hardware, in terms of software, all clients may share some common parts which are independent from the user interface. For example, the plurality of client devices may share a generic model that represents a directed graph of attributed nodes (key-value pairs) and a controller component that takes care of interacting with the collaboration server 104. Sharing common parts may reduce total cost of development (TCD) and total cost of ownership (TCO) because it may re-use code and reduce the cost of development. As a result, maintenance/support costs may also be reduced.

In one embodiment, that generic model may come with a lightweight create, read, update, delete (CRUD) application programming interface (API) offering functionality to both retrieve and alter the model state (such as adding new and deleting existing nodes, setting attribute values, adding and removing atomic and list-valued references). Further, the generic model may come with a listener API that allows for registering callback functions that are invoked whenever the model may be changed (either locally or when applying a "remote" change operation that was received from the collaboration server). The controller may provide the operational aspects of the collaboration that submits and receives operations, and also may implement the lifecycle management and failover features of the client including logging in (off) to (from) the coordinator and be recovered upon logon. In addition to the aforementioned listener API (on top of the model), the controller also may allow for registering callback functions that are invoked at various points in the clients lifecycle (e.g., after recovery, when being logged off, etc.).

In one embodiment, the client components may be based on scripting language (e.g., ECMAScript) and implemented as a Web-based, collaborative BPMN editor. The collaboration server 104 may implement a single coordinator entity for a variety of clients (e.g., web browser based clients for stationary devices and custom clients for mobile devices). Further, the mobile devices (e.g., the PDA 108, the smart phone 110, the pad device 112) may provide visualization and user interaction patterns for every stage of a collaborative design process. In one embodiment, the stages may include brainstorming, process analysis, process modeling, review and signoff, finalization of a process model.

Brainstorming may be the initial stage where project participants need to agree on the scope, timeline, purpose, and the goals of the project. The project participants also need to define their roles and come to a mutual understanding of one another's contributions. Although the brainstorming session(s) traditionally have been conducted in face-to-face meetings, the mobile devices of the present invention (e.g., the PDA 108, the smart phone 110, the pad device 112) may help participants to participate (e.g., presenting ideas, taking notes preserve the findings of that meeting for later project phases) while they are in transit. In addition, the mobile devices may also help the project participants meeting in the same room to participate.

After the brainstorming, before the project participants can commence modeling, they may need to analyze the process first in a process analysis stage. During this process analysis state, various process parameters and boundary conditions may be captured, which may include resources, interfaces (inputs and outputs), key performance indicators (KPIs) and service-level agreements (SLAs), involved roles, functions, events, etc. This stage of the modeling process may be complicated in that participants may call same things differently, different things the same, have impartial knowledge of the process to be modeled, and different views on how the process should be executed and modeled accordingly. Unmitigated disagreement at this stage may negatively affect later stages of the modeling process.

Although there may be some overlap with the brainstorming phase, process analysis is about content whereas the initial brainstorming phase is about administrative issues and project-level "meta" information. Process analysis may already happen outside face-to-face meetings and may entail capturing an "as is" process where it really happens. For the latter, sensors of mobile devices (for example, cameras of the PDA 108, the smart phone 110, the pad device 112) may be used to record some process information.

Subsequent to the process analysis, the actual design work may happen during a process modeling stage where participants build up a process model that documents the outcome of the project. Participants may be located in different time zones and may work on the model at different points in time using one or more of the desktop computer 114, the laptop 106, the PDA 108, the smart phone 110, the pad device 112. The process modeling stage is to bootstrap the process from the notes and findings that were gathered during the brainstorming and analysis phases.

Once the project has progressed to a state where a process model exists that addresses all requirements that were identified in the brainstorming phase, it needs to be reviewed in a review and signoff stage (e.g. by some customer, stakeholders, business partners, line managers, process owners, etc.). Reviewers may comment on the current state although they do not alter the process themselves. As a result, process modeling may need to be continued to incorporate the reviewers' comments.

After the process model is signed off, during a finalization stage, it may be handed over to some successor activity. That may include automating the process in some Business process management (BPM) suite or re-engineering a real-world procedure by using the process as a blueprint. In any case, the process diagram needs to be forwarded to another party, for instance by sending it through email.

Figure 2:
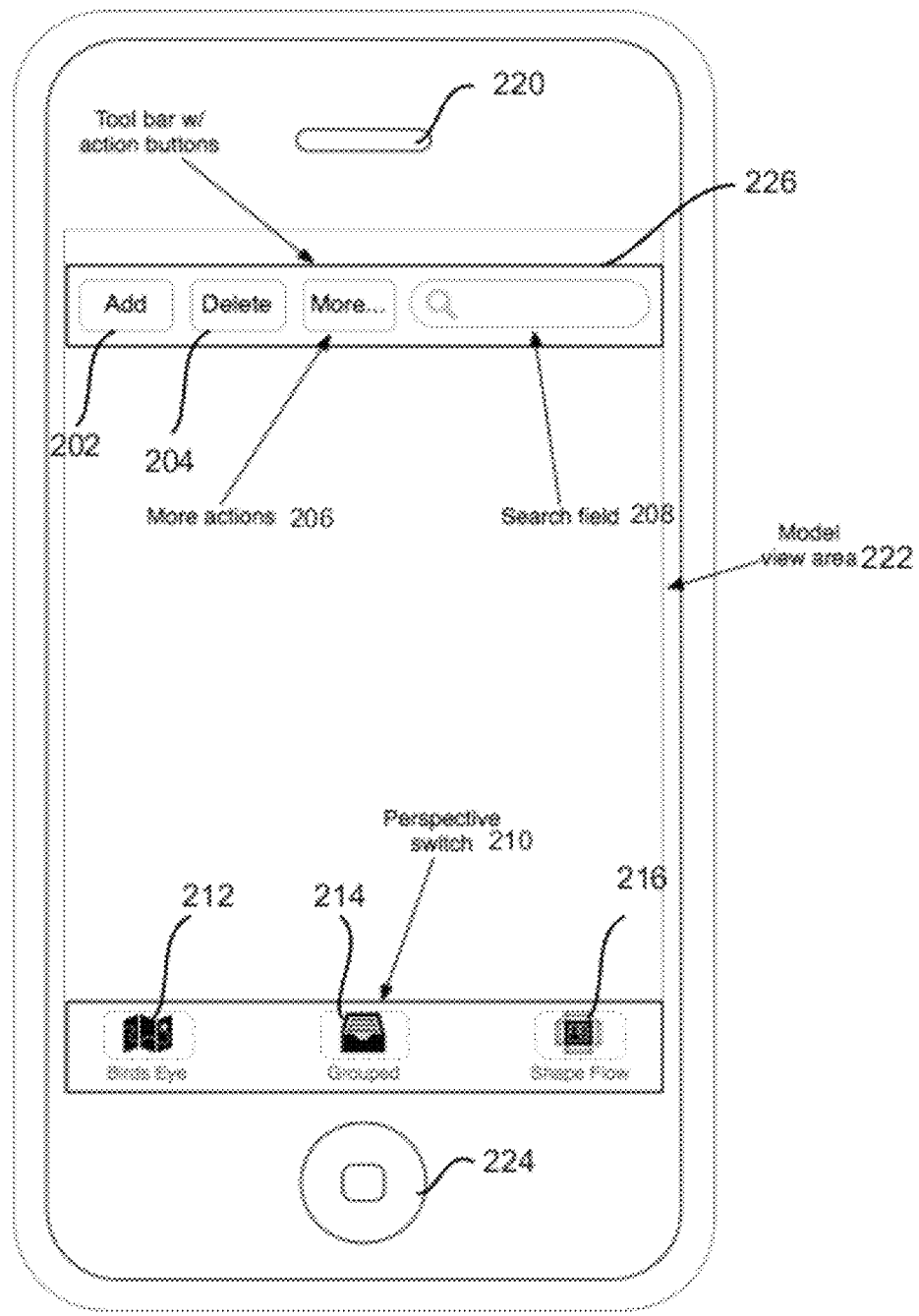
FIG. 2 illustrates an exemplary screen layout for a mobile device according to an embodiment.
Figure 3:
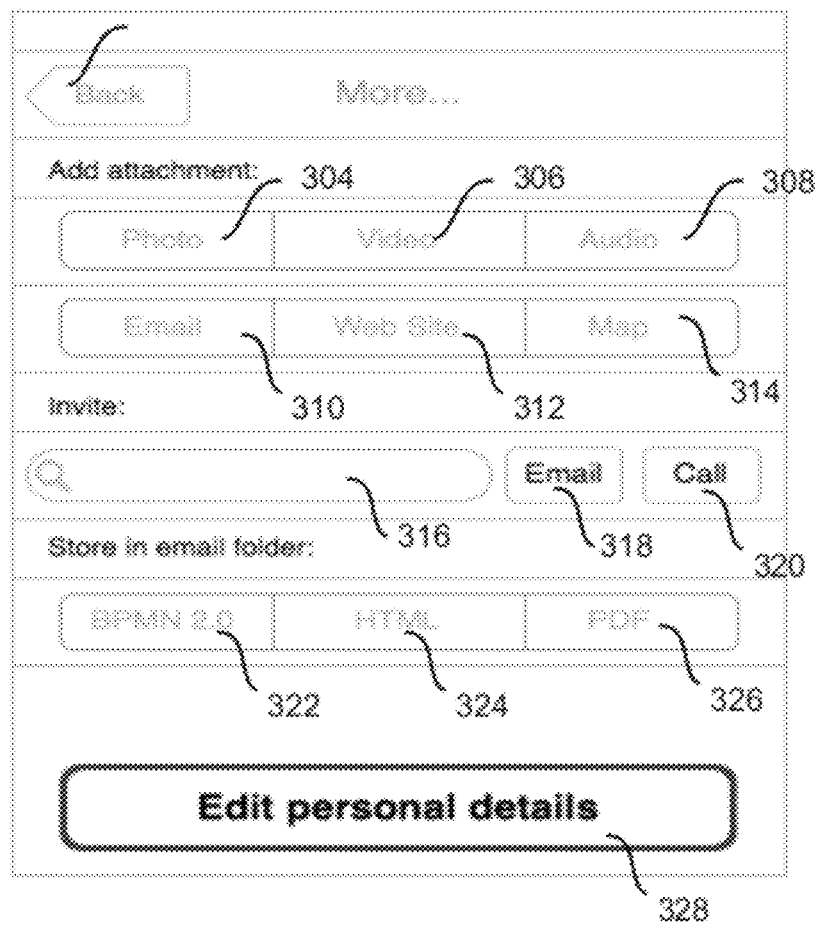
FIG. 3 illustrates an exemplary screen display for a mobile device according to an embodiment.

FIG. 2 illustrates an exemplary screen layout 200 for a mobile device according to an embodiment. The mobile device may include a speaker 220 and a power switch 224. The screen layout 200 may comprise a toolbar 226, a model view area 222 and a perspective switch 210. The toolbar 226 may include action buttons: an add button 202, a delete button 204 and a more actions button 206. In addition, the toolbar 226 may include a search field 208. The toolbar 226 may provide access to most frequently used actions, for example, adding model entities by the add button 202, deleting model entities by the delete button 204, and searching by the search field 208 for entities such as notes/comments, attachments, and BPMN elements (activities, gateways, events, etc.). The more actions button 206 may give access to secondary, less frequently used functionality, which are shown in FIG. 3 and described in detail below.

The search field 208 may let a user search for key words that are contained in model entities. In one embodiment, if one or multiple matching entities exist, the screen layout 200 may automatically navigate to the first match. The user may progressively skip ahead to successive matches until no further matches exist. Also, the user may place a "bookmark" on a match, allowing for easily retrieving that entity again at a later point in time. In another embodiment, a list of the matching entities may be displayed by the screen layout 200 and the user may navigate to any matching entities by scrolling and clicking on the entity.

The model view area 222 may occupy a major portion of the screen layout 200. The model view area 222 may render any model being worked on (or rather a portion thereof like a single entity). At the bottom of the screen, the perspective switch 210 may include a plurality of buttons to let a user switch between different rendering schemes. In one embodiment, three views and interaction schemes may be provided: a global view button 212 may provide a "birds eye" view on the whole diagram, a grouped view button 214 may provide a grouped view of model entities shown in a list with multiple groups, and a shape flow view button 216 may provide a two-dimensional "shape flow" view for natural diagram navigation based on entity proximity or associations.

The global view may render a complete model diagram (or significant portions thereof) instead of only single entities. It may resemble a traditional model editor and may offer editing features. For small-screen devices, the global view may provide a means of getting a full impression of the process and drilling down into details, where required. In one embodiment, the global view may complement the two other views thus will not be the only view supported. The two other views and interaction schemes are shown in subsequent figures and will be described in details below.

In one embodiment, the screen layout 200 may be a generic screen layout specifically tailored to small-screen mobile devices. It should be noted that the screen layout 200 is only an example visualization for mobile clients. Actual implementations may deviate from the given layout and organize the screen differently. The screen layout 200 may be adjusted to the size of the mobile device that is small enough to be held by a single hand and to also fit into a small pocket. The mobile device implementing the screen layout 200 may be any one of the PDA 108, smart phone 110 or the pad device 112 shown in FIG. 1. It should be noted that even though smart phone screens may have recently been improved in terms of their resolution (i.e., pixel density), the size as such may remain limited. Thus, any visual rendering on those screens may be limited in details and may display limited information at a time.

Further, the screen layout 200 may rely on touch gestures where users interact with control buttons on the screen by touching them. Beyond simply touching the screen, a number of touch "gestures", using one, two or more fingers exist, such as wiping, tapping, etc. Moreover, the mobile device implementing the screen layout 200 may come with a number of built-in sensors for varying purpose, for example, a high-resolution camera that allows for taking photos and recording videos, a microphone that lets one record audio signals (music, sound, speech), a GPS receiver that determines the current geographical coordinates, a gyroscope by means of which the tilt and movement of the device can be tracked. In one or more embodiments, other sensors (such as proximity, brightness, temperature, and air pressure detectors) may additionally exist and be used (e.g., to attach environmental data to the process model).

The additional actions provided under the more actions button 206 of FIG. 2 may be referred to second-level actions. FIG. 3 illustrates an exemplary screen display 300 for second-level actions on a mobile device according to an embodiment. The screen layout 300 may comprise a back button 302 to return to a previous screen display and buttons for second-level actions. The second-level actions supported by the screen display 300 may include attaching documents, inviting someone to the collaboration, storing model content in an email folder, and editing personal settings. In one or more embodiments, those actions may be split into multiple screens or presented in a different way.

As shown in FIG. 3, the buttons for attaching documents may include a photo button 304, a video button 306, an audio button 308, an email button 310, a web site button 312 and a map button 314. The documents may include data originating from the devices' sensors (e.g., photos, videos, audio recordings, etc.) and other programs installed on the device (emails, links to web sites, map sections, etc.). The buttons for inviting someone to the collaboration may include a search field 316 to search contact information in an address book for the invitee, an email button 318 to send an email and a phone call button 320 to give a phone call to invite the invitee. The buttons for editing personal settings may include a edit personal details button 328 to edit personal settings (such as adding/changing a thumbnail image).

Content of a model entity currently worked on by a user may be saved into a personal email folder (e.g., in BPMN format with a collection of notes or a full-blown BPMN diagram). The buttons for storing model content in an email folder may include: a BPMN button 322 for exporting the current model state as BPMN 2.0 exchange file, an HTML button 324 to export the model content as HTML page(s) and another button 326 to export the model content in an industry standard format (e.g., PDF document(s)). Other formats are conceivable and so is the way the document is stored. In one embodiment, email may be the most straightforward way of preserving model copies for both personal re-use and forwarding models to non-participating people.

Figure 4:
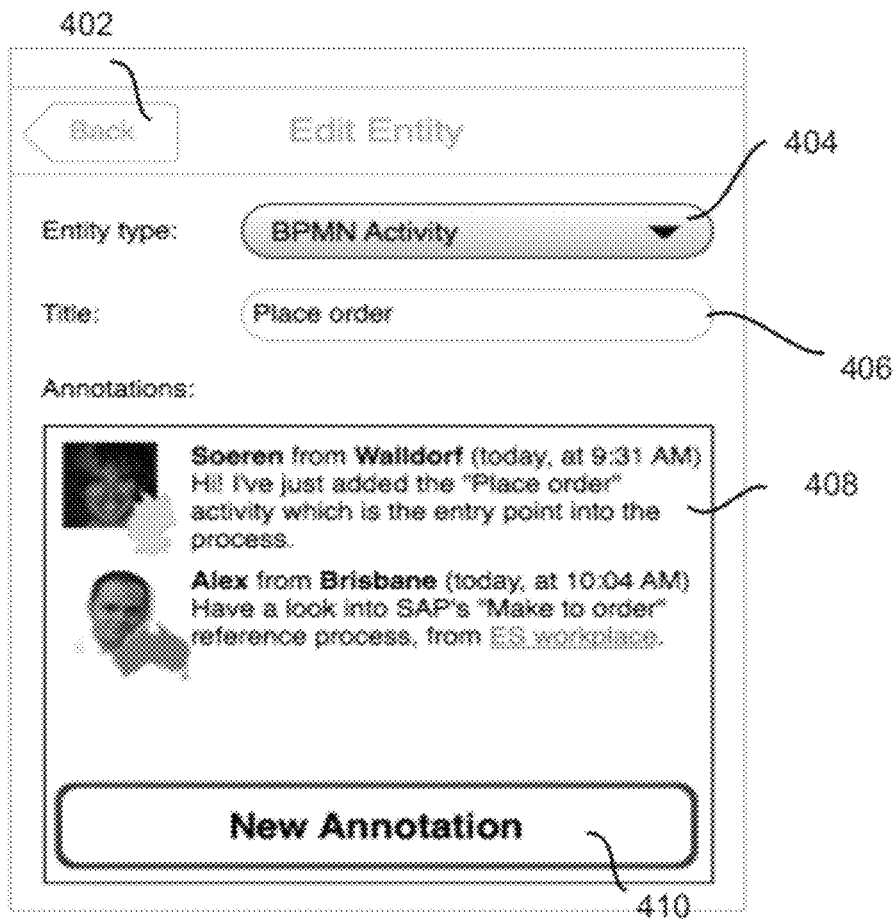
FIG. 4 illustrates another exemplary screen display for a mobile device according to an embodiment.

FIG. 4 illustrates another exemplary screen display 400 for a mobile device according to an embodiment. The exemplary screen display 400 may be a display for adding or editing model entities and may comprise a back button 402 to return to a previous screen display, a drop down selection switch 404 to choose from a variety of entity types, a title field 406 to display the title of the entity being edited, a display area 408 for annotations for the entity being edited and a button 410 for a user to add more annotations. Apart from a title and an entity type, each entity may be made up by a sequence of annotations, possibly originating from different participants as shown in the display area 408. Those annotations may specify further details of the entity. People may also add attachments (e.g., photos, emails, texts, maps, etc.) to model entities (not shown).

In one embodiment, the model domain may determine which entity types may be available. In the given example scenario, those would be BPMN entities (i.e., activities, gateways, events, etc.) for proper process modeling, resource-style annotations (e.g., roles, KPIs/SLAs, materials, cost, etc.) for process analysis, and notes (like paper notes) for brainstorming or review purposes. Further, model entities may be "morphed" into other entity types, for example, transitioning from a collection of grouped notes (i.e., the outcome of the brainstorming phase) to a baseline process where single notes are changed into process entities (e.g., BPMN activities). Other notes may stay like notes and merely serve as decorations of the process that is being modeled.

Grouped Model View

Figure 5:
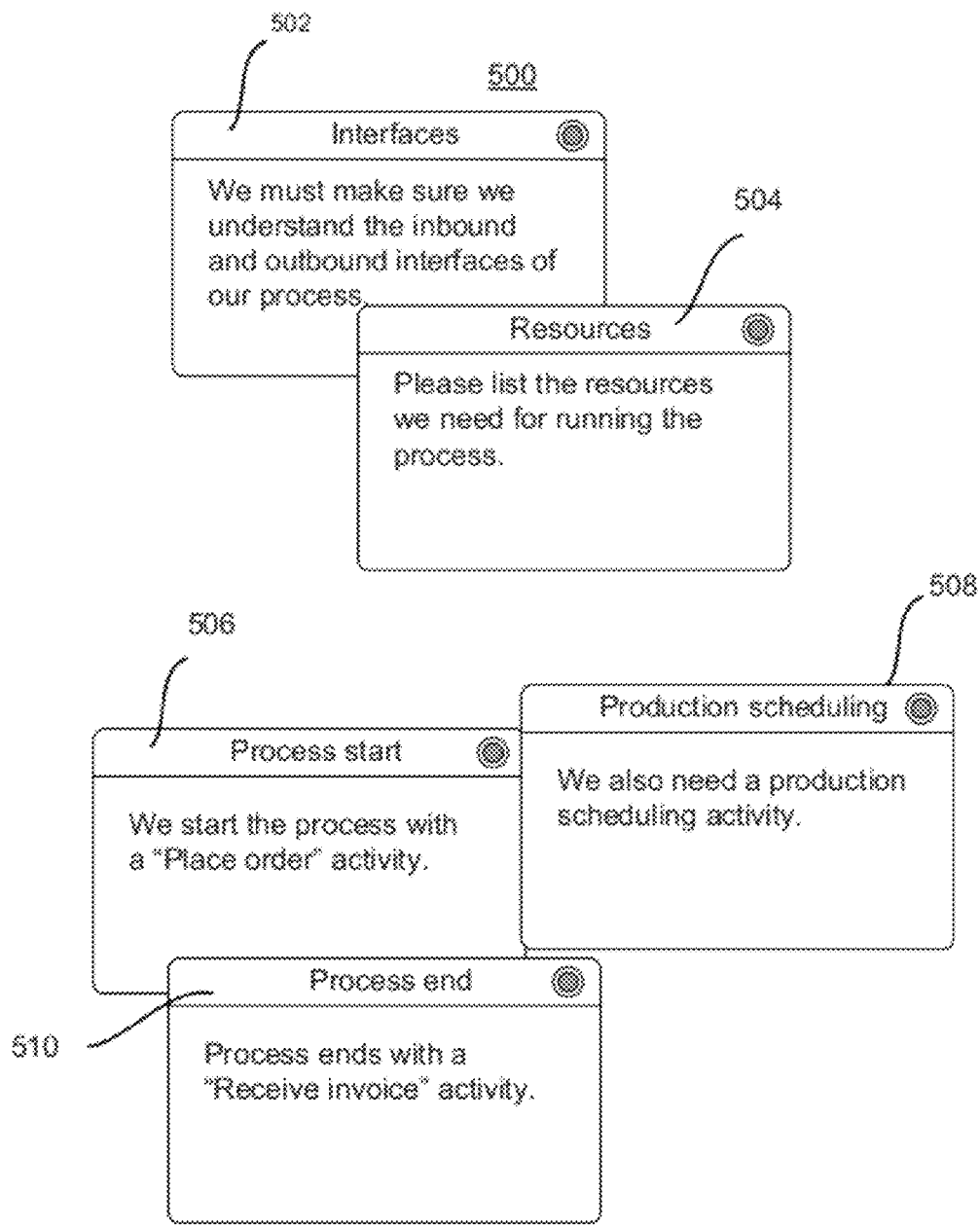
FIG. 5 illustrates an example outcome of an initial brainstorming phase according to an exemplary embodiment.

FIG. 5 illustrates an example outcome 500 of an initial brainstorming phase according to an exemplary embodiment. The example outcome 500 may comprise five model entities represented as paper notes (e.g., shapes that were put onto different coordinates of a virtual white board [two-dimensional diagram pane]): an interfaces note 502, a resources note 504, a process start note 506, a production scheduling note 508 and a process end note 510. A variety of ways may be used to display and/or group the example outcome 500.

In one embodiment, the example outcome 500 may be rendered in a list. That is, model entities may be displayed above one another and users can scroll through that list view. This way of presenting models not only caters to a good overview of what is contained in the model, but also is the only viable way of rendering the model on very small screens (like traditional mobile phones). Model entities may be ordered according to some flexible ordering criteria like:

- lexicographically by the title (name) of the model entity which allows for easily finding a particular entity,
- date and time when the entity was added or last edited which gives an impression on the model history and evolution,
- proximity-based (Euclidean distance from some starter entity like a start event in BPMN) for model entities that are represented as shapes on some one, two or three-dimensional diagram,
- by topologically ordering entities that are connected through associations (e.g., sequence connector in BPMN) which allows to easily detect dependencies among entities,
- by doing a depth-first traversal of the graph (back-links leading to cycles are ignored) which allows for following a "happy path" in the process.

Users may switch between those ordering criteria to obtain multiple perspectives onto the model which helps in understanding multiple aspects of that model.

In one or more embodiments, further to simply ordering model entities, entities may also be grouped into distinct clusters. Inside those clusters, one of the aforementioned ordering criteria may apply again (in fact, different clusters may employ different internal ordering criteria). The various criteria for clustering may include:

- the collaboration participant (i.e., user) who has added or last edited the model entities in this cluster (which gives a good overview of what user has contributed which content),
- the entity type (like activities, gateways, annotations, etc.) which allows for separating process content from other non-process content (e.g., annotations),
- the "level" of an entity that was visited in a depth-first traversal of the model graph, assuming that entities on the same level are semantically related,
- the distance-based proximity where clusters are identified by a known k-means clustering heuristics. This approach is particularly useful for notes coming out of a brainstorming session that were stuck on a virtual white board, assuming that similar notes where placed close to one another,
- for BPMN entities the lane (representing a user role) where this entity is placed into may also serve as a natural grouping criterion.

It should be noted that the above listed criteria for ordering and clustering are examples and additional sorting and grouping criteria and algorithms may be applied.

In one embodiment, a k-means clustering algorithm may be applied to the model entities of FIG. 5. As shown in FIG. 5, the interfaces note 502 and resources note 504 may be close in distance, and grouped in one cluster; the process start note 506, production scheduling note 508 and process end note 510 may be close in distance and grouped in a different cluster. These two clusters may be shown in the exemplary user interface 600 of FIG. 6. The user interface 600 may be a user interface based on the screen layout 200 and like reference numerals may refer to the same elements. Descriptions of the like reference numerals with respect to FIG. 2 are applicable to FIG. 6, and are not repeated.

Figure 6:
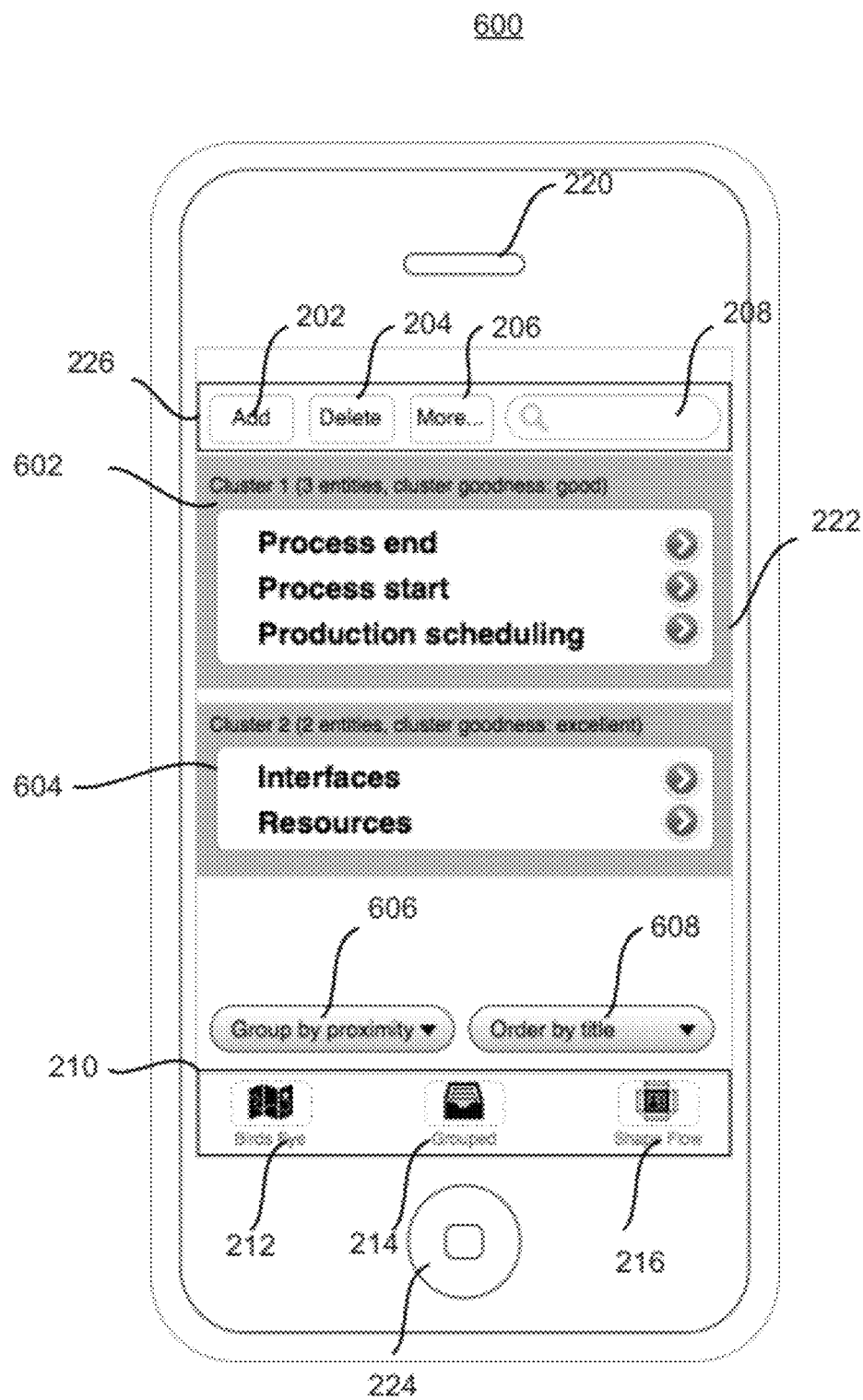
FIG. 6 illustrates an exemplary user interface for grouping model entities according to an embodiment.

In one embodiment, rendering a graph-based model on a small screen may be to present the model entities of FIG. 5 in a list and FIG. 6 shows an example. As shown in FIG. 6, the user interface 600 for a mobile device may illustrate the list of model entities in two clusters 602 and 604 in the model view area 222. The user interface 600 may further include two drop down selection switches 606 and 608 above the perspective switch 210. The cluster 602 may include three entities: the process start note 506, production scheduling note 508 and process end note 510. The cluster 604 may include two entities: the interfaces note 502 and resources note 504. In one embodiment, each cluster may be rated by how close the entities of the cluster are positioned. For example, the interfaces note 502 and resources note 504 may be more positioned very close, and the clustering may be rated as "excellent." The process start note 506, production scheduling note 508 and process end note 510 may be positioned not as close as the interfaces note 502 and resources note 504, and thus, the clustering may be rated as "good."

The two drop down selection switches 606 and 608 may allow a user to choose how to show the model entities. In one embodiment, the drop down selection switch 606 may allow a user to select from different criteria to group the model entities, such as, group by proximity. The drop down selection switch 608 may allow a user to select from different criteria to list the model entities, such as, order by title. As described above, a variety of criteria may be implemented and the drop down selection switches may provide an easy access to select desired criteria for grouping, listing, or both.

Figure 7:
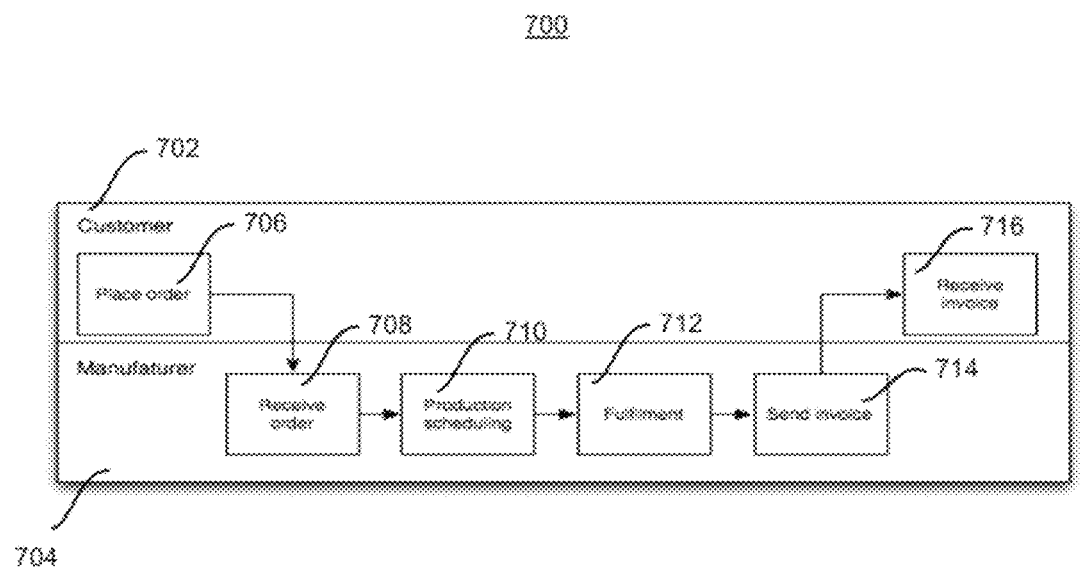
FIG. 7 illustrates an example process according to an embodiment.

FIG. 7 illustrates an example process 700 according to an embodiment. The example process 700 may comprise a customer role 702 and a manufacturer role 704. Each of the two roles may be represented as a swim lane, respectively. The customer role 702 may perform the tasks of place order 706 and receive invoice 716. The manufacturer role 704 may perform the tasks of receive order 708, production scheduling 710, fulfilment 712 and send invoice 714.

In one embodiment, a list view may use the lane association of a model entity (e.g., BPMN activity) as the grouping criterion, resulting in two groups. For ordering the entities within the group, a depth-first traversal may give an excellent reflection of how the process is structured. As a result, the model may be rendered with group 1 for the customer role 702 that contains the tasks of place order 706 and receive invoice 716, and group 2 for the manufacturer role 704 that contains the tasks of receive order 708, production scheduling 710, fulfilment 712 and send invoice 714. In another embodiment, a pure depth-ordering may give an overall sequence of model entities within the process, and thus, the entities may not need to be clustered.

In one or more embodiments, a grouped view (i.e., list-based model view) may be the rendering of choice for certain conditions, for example, small screens with restricted rendering space, getting a quick overview of the entire model, grouping and ordering model entities by various criteria (e.g., re-grouping and/or re-ordering "on the fly" when grouping/ordering criteria is changed by a user), notes resulting from the brainstorming phase, and/or simple process models having few back-edges or splits/merges of control flow edges. The grouped view may show the content of each entity and grouping/ordering relationships among the model entities.

Shape Flow View

Figure 8:
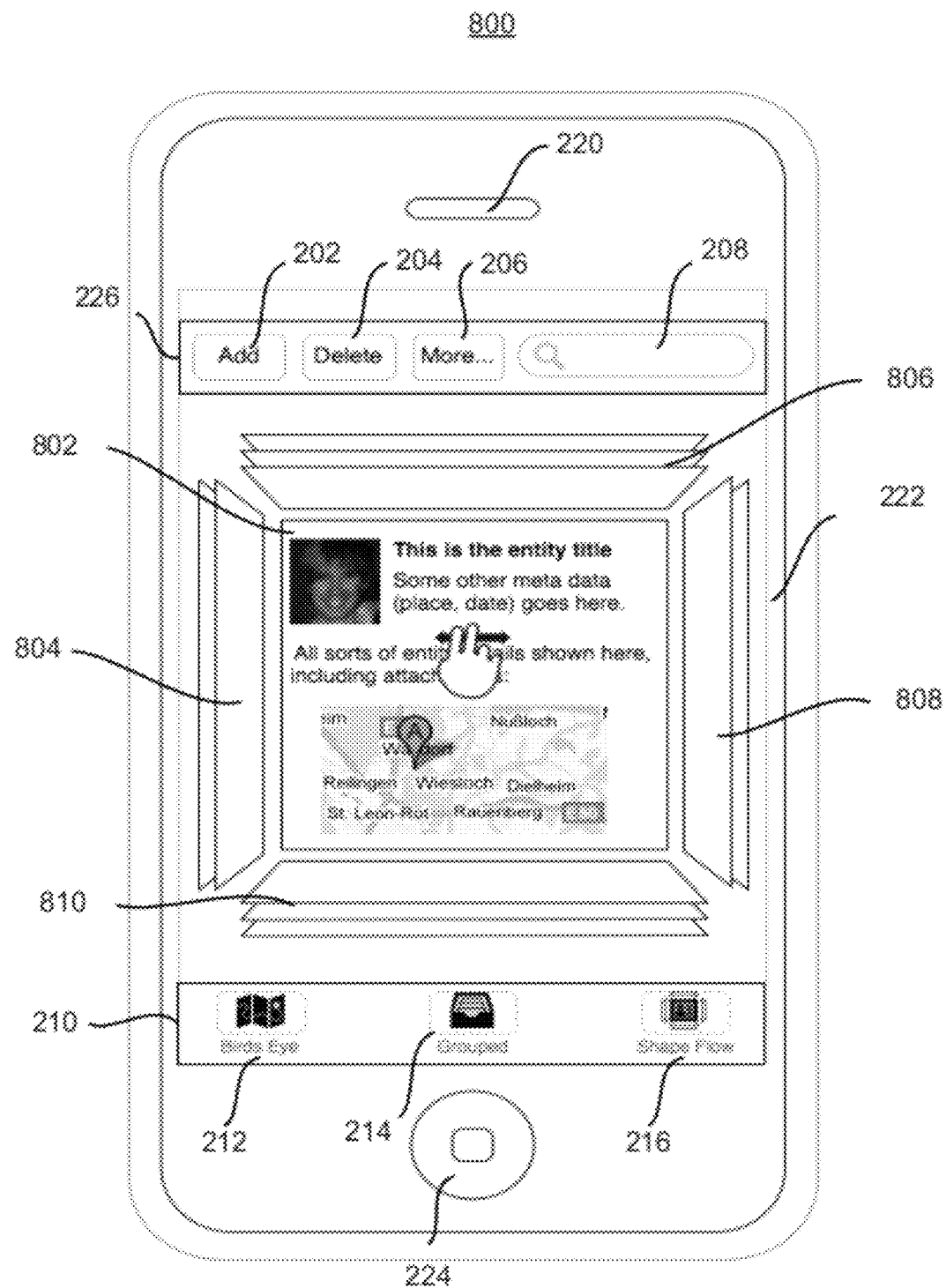
FIG. 8 illustrates an exemplary shape flow view for a mobile device according to an embodiment.

FIG. 8 illustrates an exemplary shape flow view 800 according to an exemplary embodiment. The shape flow view 800 may be a user interface based on the screen layout 200 and like reference numerals may refer to the same elements. Descriptions of the like reference numerals with respect to FIG. 2 are applicable to FIG. 8, and are not repeated. As shown in FIG. 8, the model view area 222 may comprise an entity 802 displayed in the center and four stacks of entities 804, 806, 808 and 810. The entity 802 may be a current model entity in focus (or a set of associated model entities like a BPMN activity shape with its annotations) and model view area 222 may display a title, and other entity details like annotations, metadata, attachments, photos, etc.

In one embodiment, the entity 802 may be a node in a design model and the stacks of entities 804, 806, 808 and 810 may represent neighboring entities of the model in a collapsed and folded way. As shown in FIG. 8, the neighboring entities may be stacked on the four boundary sides of the current model entity 802. Therefore, a user may swipe a touch screen, or move the device (e.g., by motion (tilting)) to navigate horizontally (left or right) or vertically (up or down) to a neighbouring entity (from one of the "stacks").

While a grouped view (e.g., FIG. 6) may list the whole model content with certain proximity and ordering information, the exemplary shape flow view 800 may present the design model with spatial relationships in a visual representation. As shown in FIG. 8, the model view area 222 may represent a zoomed-in two-dimensional drawing pane focused on one particular entity. Other neighboring entities may be stacked according to their relations to the current model entity in focus. In one or more embodiments, the exemplary shape flow view 800 may provide two-dimensional navigation based on four-quadrant spatial classification of neighboring model entities, or one-to-two-dimensional navigation based on directed inter-entity association (e.g., control flow edges, data flow edges, etc.).

The spatial model segmentation may be used for model entities that have few if any associations among one another, for example, spatially arranged notes resulting from a brainstorming phase or resource annotations on those notes added in the process analysis phase. The One- to two-dimensional navigation may be useful for process diagrams where most entities may be interconnected (in some way associated to other model entities), either through edges having different semantics (e.g., control flow, data flow, message flow, other associations). Typically, there may be few (if any) "free-floating" (unconnected) entities in a design, so that a process designer can navigate between any two entities by following associations (possibly traversing an association chain to reach a certain model entity). The grouped view and shape flow view may also be mixed to cater for diagrams that contain both—connected and unconnected (i.e., unassociated) entities.

In one embodiment, the exemplary shape flow view 800 may be a generic flow view based on a perspective of a node and may preserve the spatial relationships to a wide degree on a small-screen device to without rendering the whole model on a single screen. Further, the exemplary shape flow view 800 may render a single model entity (including full details) at a time, display "neighboring" entities (either in terms of proximity or with respect to some association type) stacked and collapsed at the left, right, bottom, and top of the current entity, and use touch gestures ("swiping" to the left, right, bottom, or top of the screen) to navigate to a neighboring entity.

In at least one embodiment, a user browsing the model using a shape flow view may also have a "cursor" placed onto the model entity that is currently focused. A cursor may be another model entity which may indicate that a particular user has browsed to a specific model entity. A global rendering of the model (like in the birds eye perspective) may show this cursor (e.g., shadowing, highlighting, or painting a frame around the focused model element). This kind of visual feedback in the global view may allow for using the mobile device in a remote control-like manner (like a pointing device) which may be useful when projecting the global view (i.e., the whole diagram) happens at the same time (at the same place or at different places) where a user browses the model with his or her mobile device. For example, a user may give a presentation remotely to an audience viewing the model projected in a big display while the user may focus on an entity using a mobile device.

Figure 9:
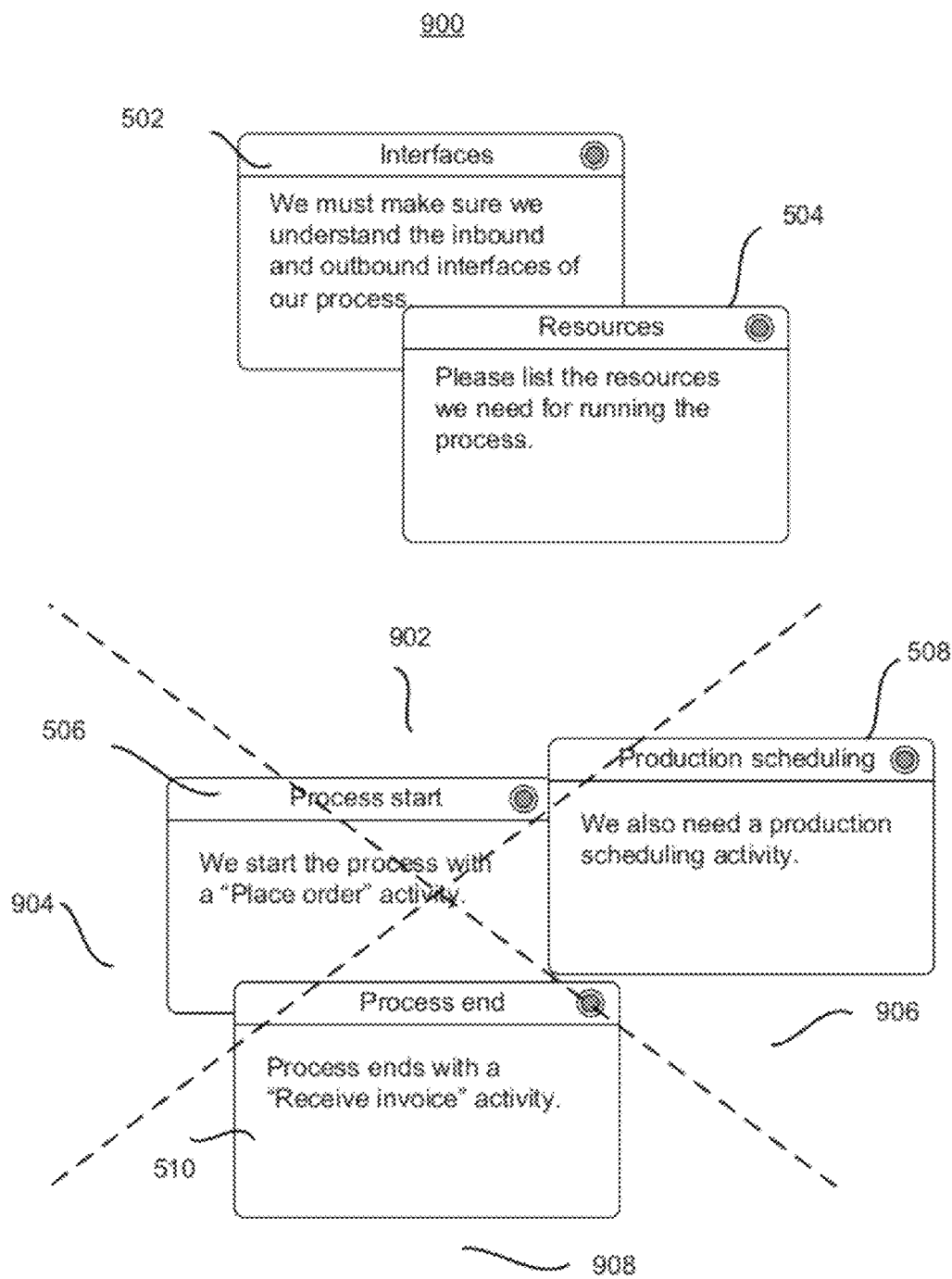
FIG. 9 illustrates an exemplary model view according to an embodiment.

As described above, the diagram space of a model may be split into four quadrants, for example, the four stacks of neighbouring elements of FIG. 8 may be computed in an entity-centric, proximity-based manner. FIG. 9 illustrates an exemplary model view 900 that may present a four-quadrant spatial classification of neighboring model entities according to an embodiment. As shown in FIG. 9, the exemplary model view 900 may show the two-dimensional exemplary model view 500 being separated in four quadrants: a top quadrant 902 that may contain interfaces note 502 and resources note 504; a left quadrant that may be empty; a right quadrant 906 that may contain production scheduling note 508; and a bottom quadrant 908 that may contain a process end note 510. The process start note 506 may be at a center. In one embodiment, the four quadrants may be computed from a centered entity that is currently displayed.

Figure 10:
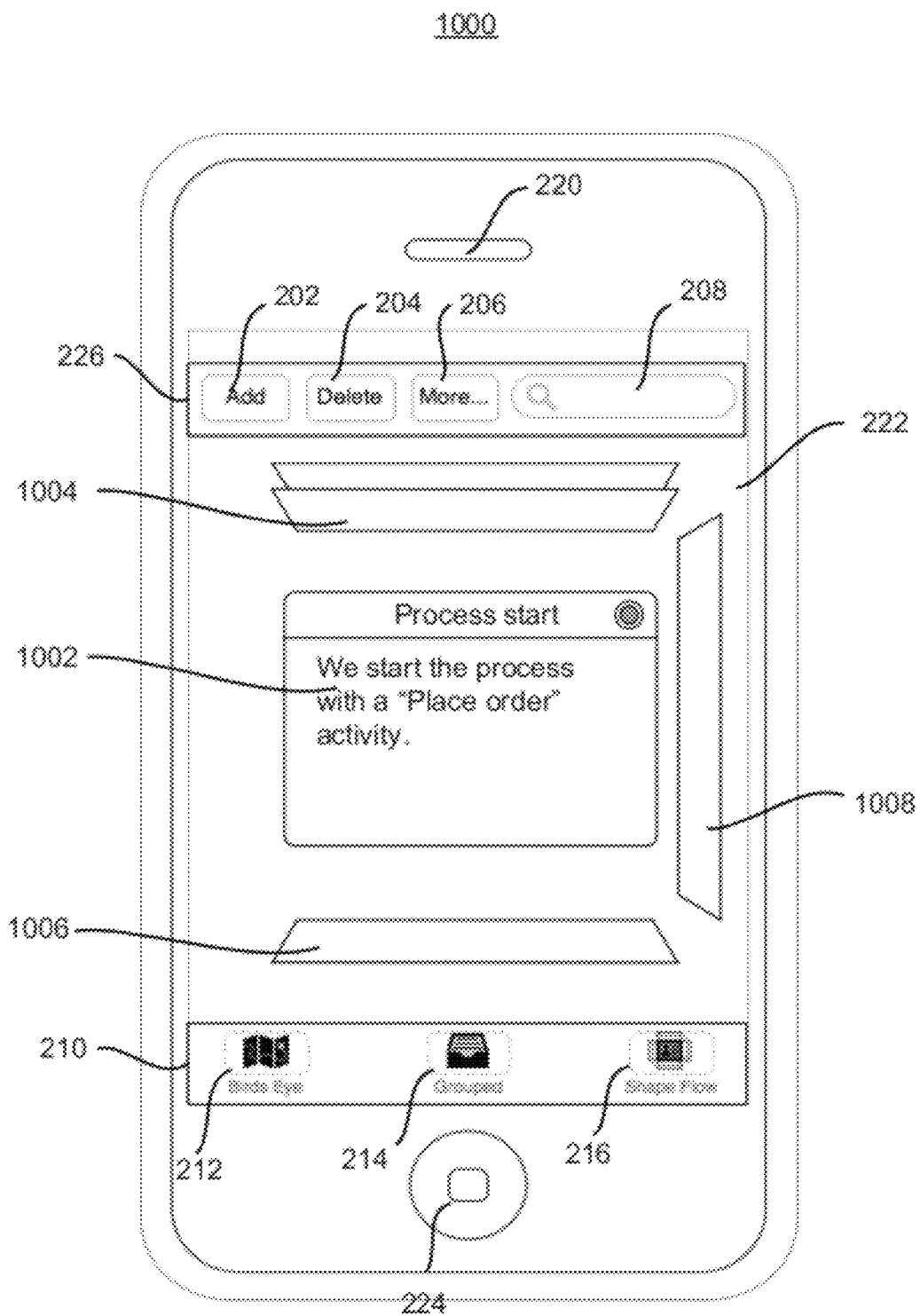
FIG. 10 illustrates an exemplary model view according to an embodiment.

FIG. 10 illustrates an exemplary shape flow view 1000 for the four quadrant segmentation model view 900. The shape flow view 1000 may be a user interface based on the screen layout 200 and like reference numerals may refer to the same elements. Descriptions of the like reference numerals with respect to FIG. 2 are applicable to FIG. 10, and are not repeated. As shown in FIG. 10, the shape flow view 1000 may comprise a "Process start" model entity 1002, a top stack of model entities 1004, a bottom stack of model entities 1006 and a right stack of model entities 1008. The "Process start" model entity 1002 may be displayed at the center of the model view area 222. The left of the "Process start" model entity 1002 may be empty because there is no model entities located to the left of the process start note 506 in FIG. 9. The top stack of model entities 1004 may contain "Interfaces", "Resources" entities represented by the interfaces note 502 and resources note 504, the right stack of model entities 1008 may contain "Production scheduling" entity represented by the production scheduling note 508, and the bottom stack of model entities 1006 may contain "Process end" entity represented by the process end note 510.

From that "Process start" model entity 1002, in one embodiment that may support swiping, one cannot swipe right (as there are no entities on the left); by swiping to the left, the "Production Scheduling" entity may get focused; by swiping to the top, the "Process end" entity gets focused; and by swiping downwards, the "Resources" entity is focused. In this way, a user may easily explore the model content. Further, when adding a new entity while some other entity is currently focused, that new entity will be placed beside the currently focused entity. In one embodiment, an algorithm may add the new entity to a side by selecting the quadrant that has the least contained entities.

In one embodiment, the shape flow view may allow browsing process models in a semantically meaningful way. For example, a process model may be explored by either following the control flow connectors (for an orchestration-angled understanding of the process) or traversing the message flow edges (to understand the choreography aspects of the process). For example, the flow shown in FIG. 7 may be an association type to be consulted for computing the neighboring elements. For instance, a BPMN element may have outgoing (source of) and incoming (target of) control flow edges. This plain, transitive relation may be exploited to compute stacks of predecessor and successor model entities which can be shown on the left and right of the currently focused entity.

Figure 11:
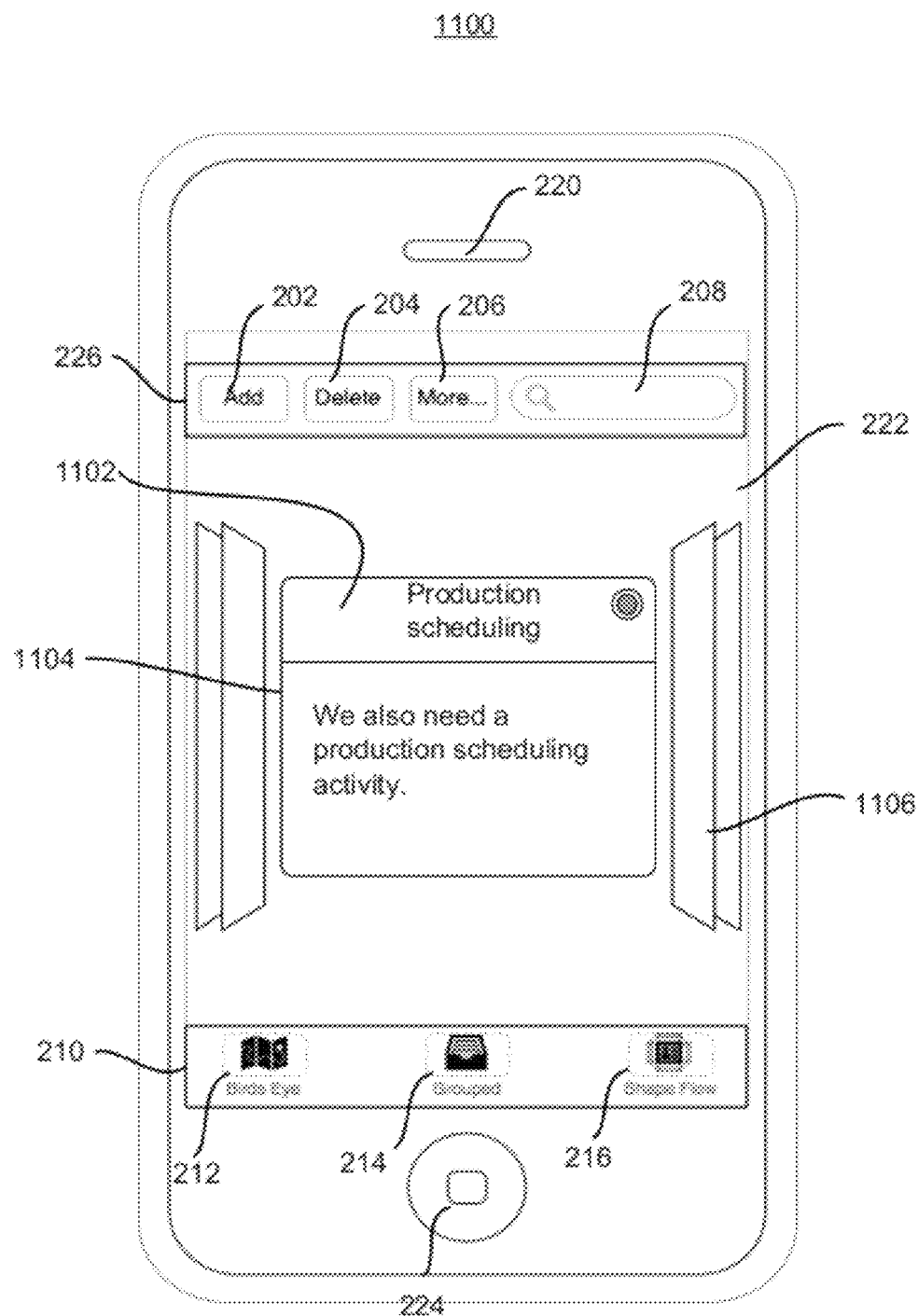
FIG. 11 illustrates an exemplary model view according to an embodiment.

FIG. 11 illustrates an exemplary shape flow view 1100 of the process 700 on a mobile device according to an embodiment. The shape flow view 1100 may be a user interface based on the screen layout 200 and like reference numerals may refer to the same elements. Descriptions of the like reference numerals with respect to FIG. 2 are applicable to FIGS. 11, and are not repeated. The shape flow view 1100 may comprise a "Production Scheduling" model entity 1102, a left stack of model entities 1104 and a right stack of model entities 1106. The "Production Scheduling" model entity 1102 may be displayed at the center of the model view area 222. The left stack of model entities 1104 may comprise the entities "Receive order" and "Place order" (predecessor entities of which the currently focused entity is a [transitive] target), and the right stack of model entities may comprise "Fulfillment", "Send invoice", and "Receive invoice" ([transitive] successor entities).

In one embodiment, the control flow and message flow associations may be used interchangeably or even simultaneously (e.g., two association types may be selected from a variety of types, such as control flow, data flow, message flow, etc. to be shown simultaneously). In another embodiment, the association used for a shape flow view may be based on other associations like data flow connectors or annotation associations.

Figure 12:
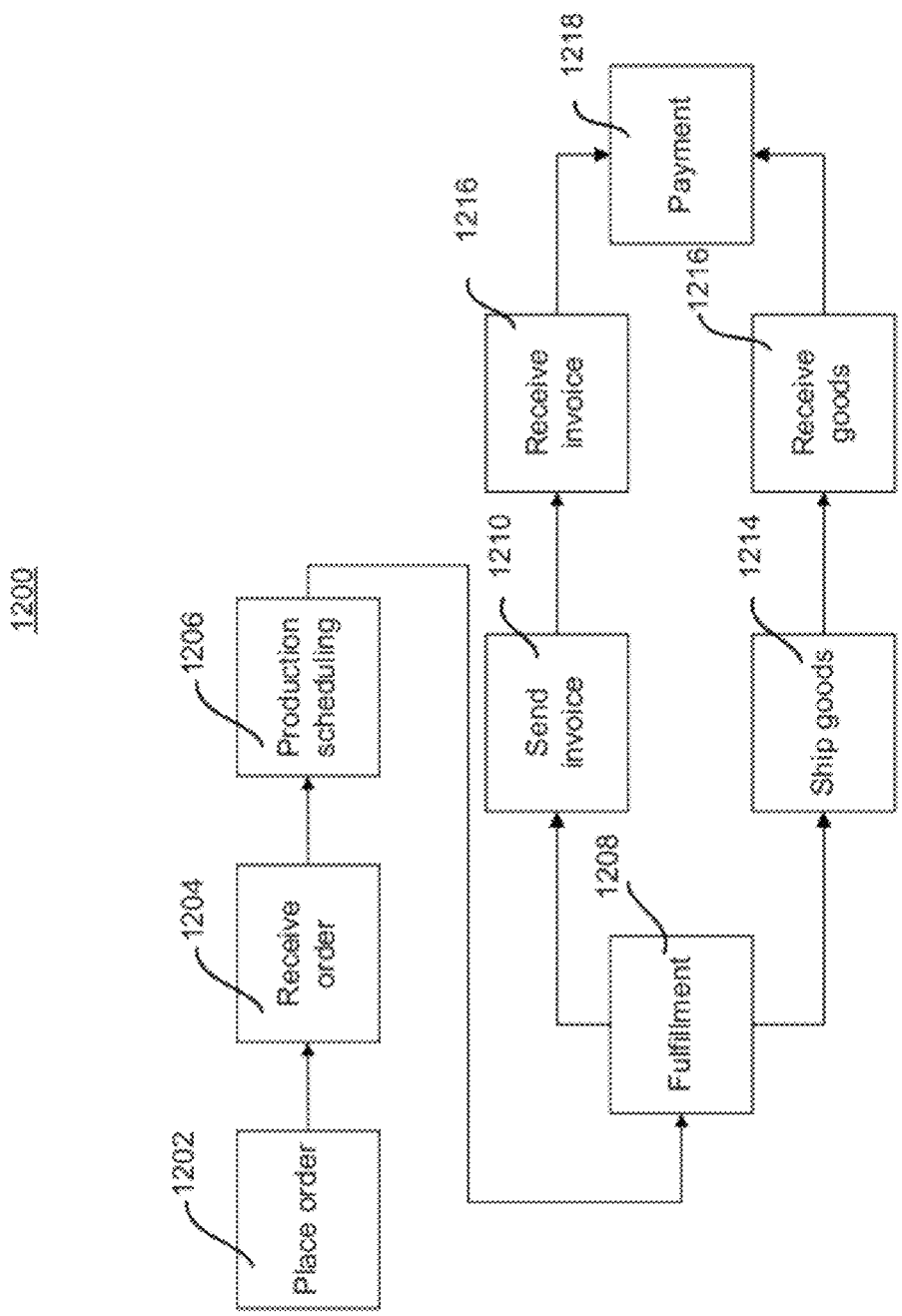
FIG. 12 illustrates an exemplary process with multiple source and target associations according to an exemplary embodiment.

Some processes may be more complex than the process 700, and may contain multiple (i.e., more than one) associations that a particular a model entity is source or target of. FIG. 12 illustrates an exemplary process 1200 with multiple source and target associations in terms of flow control according to an embodiment. The exemplary process 1200 may be an extended variant of the process 700. The exemplary process 1200 may comprise design model entities of place order 1202, receive order 1202, production scheduling 1206, fulfilment 1208, send invoice 1210, receive invoice 1212, ship goods 1214, receive goods 1216 and payment 1218. As shown in FIG. 12, from the place order 1202 to the fulfilment 1208, the process 1200 has only one flow, that is, the process 1200 may start at place order 1202, then receive order 1204, then production scheduling 1206 and fulfilment 1208. From the fulfilment 1208, the process 1200 may comprise two flows: a first flow from the fulfilment 1208 to the send invoice 1210, then to the receive invoice 1212, and then ending at the payment 1218; and a second flow from the fulfilment 1208 to the ship goods 1214, then to the receive goods at 1216, and then ending at the payment 1218.

As shown in the process 1200, any model entity may be a source and/or a target of an association. Some entities, such as, the fulfilment 1208 may be a source for two associations and the payment 1218 may be a target for two associations. That is, the two entities fulfilment 1208 and payment 1218 are either a source or a target of multiple associations (control flow connectors). This situation may pose a challenge in two ways: (1) where to navigate to when swiping left or right, respectively and (2) how to be able to navigate to all successor or predecessor entities (according to a particular association type, e.g., control flow connections) when some entities may have multiple successor or predecessor entities, respectively. In one embodiment, the first challenge may be solved by non-deterministically choosing some successor/predecessor entity, for example, choosing any one of the first, middle, or last successor or predecessor. The second challenge may be solved by: crossing screens and second-level navigation as described below according to embodiments of the present invention.

Figure 13:
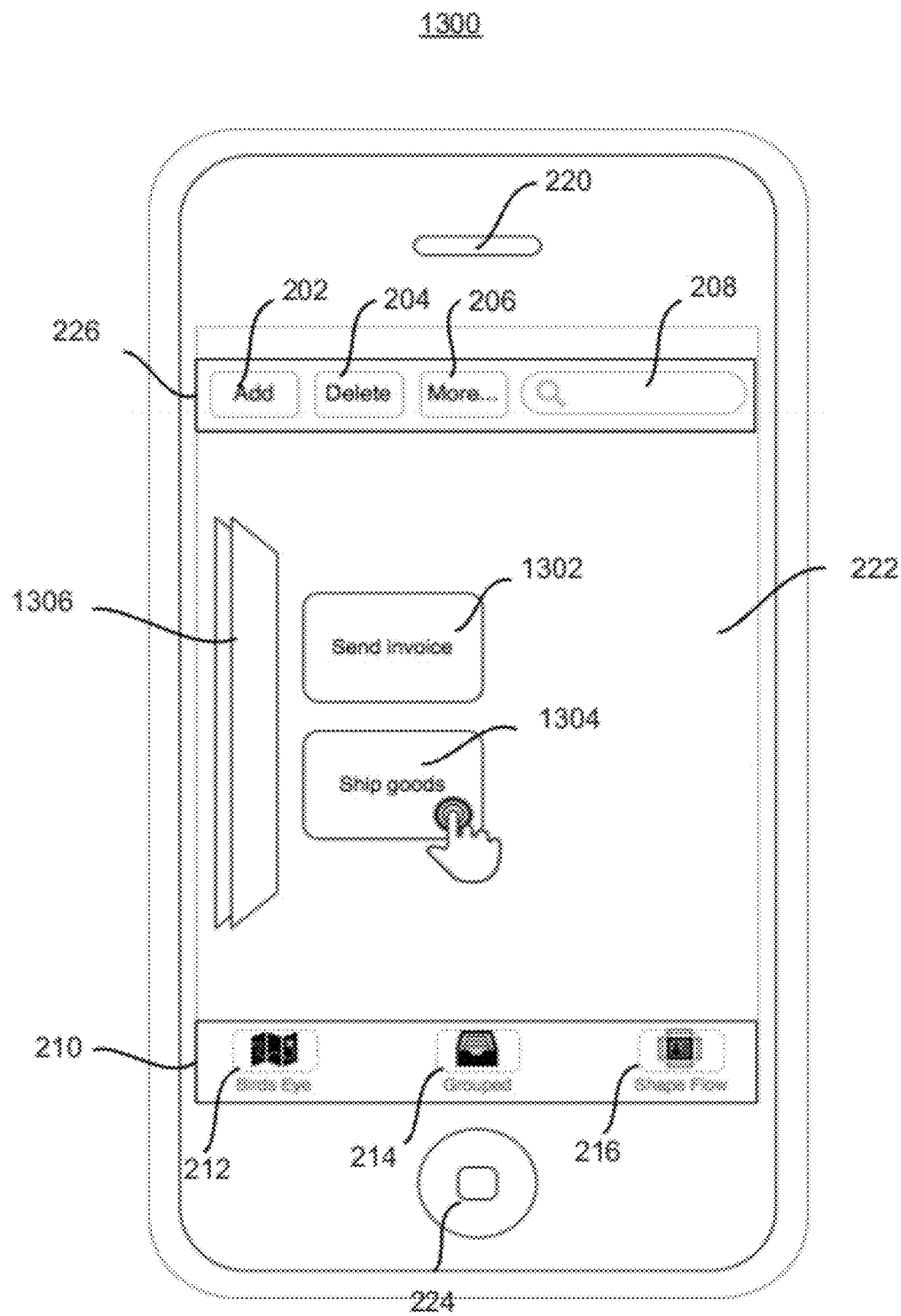
FIG. 13 illustrates another exemplary screen display for a mobile device according to an embodiment.

FIG. 13 illustrate an exemplary shape flow view 1300 according to an exemplary embodiment. The shape flow view 1300 may be a user interface based on the screen layout 200 and like reference numerals may refer to the same elements. Descriptions of the like reference numerals with respect to FIG. 2 are applicable to FIG. 13, and are not repeated. The shape flow view 1300 may comprise the thumbnail images of send invoice entity 1302 and ship goods entity 1304, and a left stack of model entities 1306. FIG. 13 may be an exemplary crossing screen for multiple associations. That is, the shape flow view 1300 may be special-purpose screens for choosing which predecessor or successor entity to show next when multiple successor or predecessor entities exist. For example, the shape flow view 1300 may be an exemplary crossing screen when swiping left from a fulfilment entity 1208 according to the process 1200. The user may need to choose (e.g., by tapping) one of these thumbnail images to determine which predecessor should be navigated to. FIG. 13 shows an example of one entity ("Fulfillment" activity) having multiple successor entities ("Send Invoice", "Ship goods" activities). Crossing screens may also be employed for entities having multiple predecessor entities (e.g., "Payment") or entities having both multiple predecessor and multiple successor entities (not shown). In one or more embodiments, with the help of the crossing screens, the entire model may be navigated in one dimension (e.g., horizontally).

Figure 14:
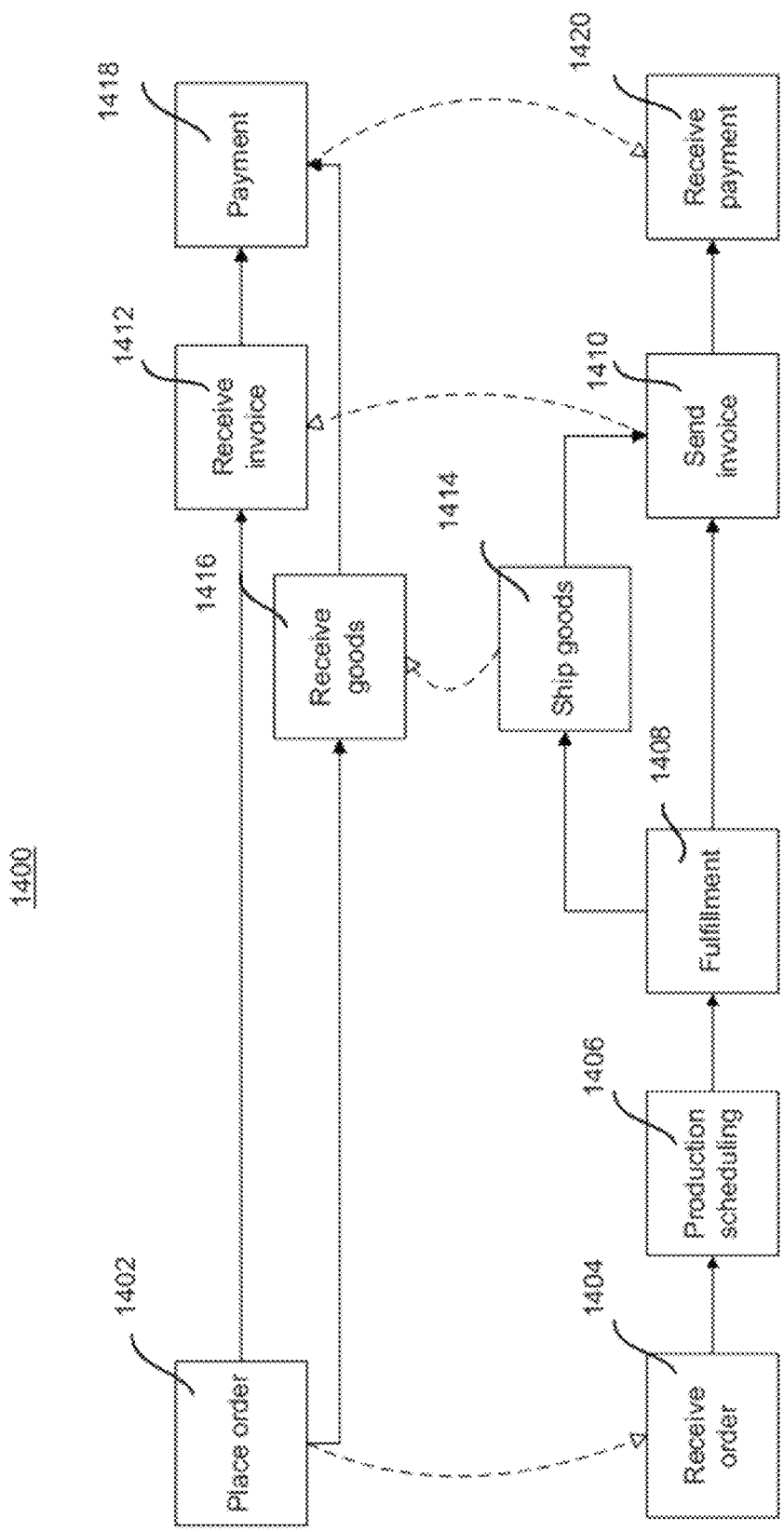
FIG. 14 illustrates another example process according to an exemplary embodiment.

FIG. 14 illustrates an exemplary process 1400 having both control flow and message flow connectors according to an embodiment. The process 1400 may comprise design model entities of place order 1402, receive order 1404, production scheduling 1406, fulfilment 1408, send invoice 1410, receive invoice 1412, ship goods 1414, receive goods 1416, payment 1418 and receive payment 1420. Most of the design model entities of the process 1400 may be similar to design model entities of the process 1200. However, the process 1400 may distinguish the control flow from the message flow, for example, the control flow may be shown in solid lines and message flow may be shown in dashed lines. Therefore, as shown in FIG. 14, some entities may have both incoming or outgoing control flow (solid lines) and message flow associations (dashed lines). For instance, the payment entity 1418 may have two incoming sequence flow connectors (from the receive invoice 1412 and receive goods 1416, respectively) and an outgoing message flow connector (to the receive payment 1420).

Figure 15:
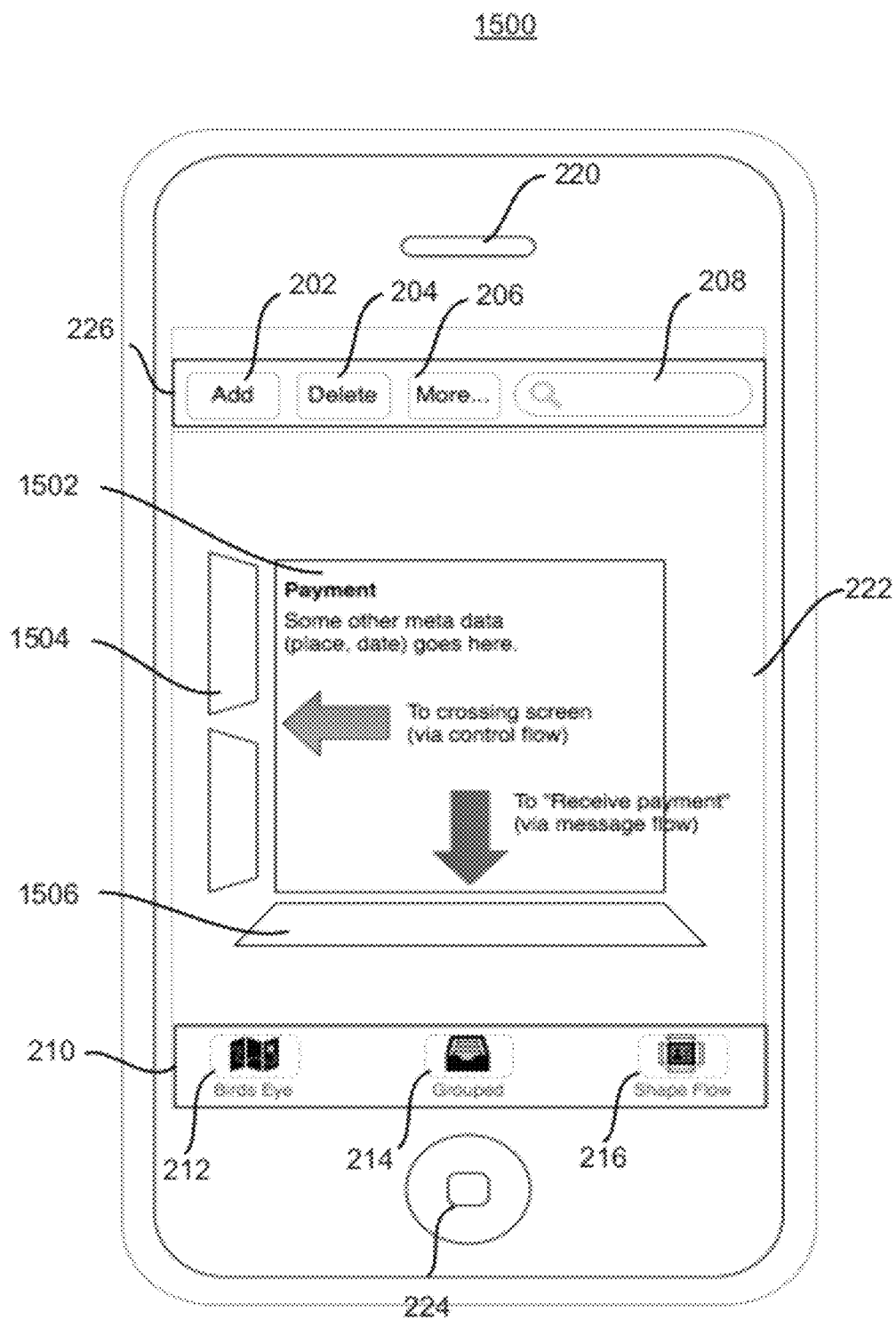
FIG. 15 illustrates another exemplary screen display for a mobile device according to an embodiment.

In one embodiment, the shape flow views according to an exemplary embodiment may provide navigation according to two association types using the same visualization. That is, two dimensions of navigation may be used for two different association types respectively, for example, horizontal navigation for control flow and vertical navigation for message flow. FIG. 15 illustrate an exemplary shape flow view 1500 according to an exemplary embodiment. The shape flow view 1500 may be a user interface based on the screen layout 200 and like reference numerals may refer to the same elements. Descriptions of the like reference numerals with respect to FIG. 2 are applicable to FIG. 15, and are not repeated. As shown in FIG. 15, the exemplary shape flow view 1500 may comprise a currently focused model entity 1502 (e.g., the payment entity 1418 of FIG. 14), and a left stack of model entities 1504 and a bottom stack of model entities 1506. The horizontal navigation may be based on control flow, and thus, the left stack of model entities may indicate a crossing screen where the user can choose from the two predecessor entities of the receive goods entity 1416 and receive invoice entity 1412 according to the process 1400. The vertical navigation may be based on message flow, and thus, the bottom stack of model entities may be the receive payment entity 1420 according to the process 1400. Similar two dimensional navigation may also be provided to other entities that have both control flow and message flow connections (e.g., the place order entity 1402, the receive order entity 1404, etc.). In one embodiment, the navigation mechanism (e.g., navigation via both control flow and message flow) provide by the shape flow view 1500 may be used in combination with crossing screens to navigate a whole model.

In addition to crossing screens as described above, embodiments of the present invention may take another approach for treating multiple incoming/outgoing associations, which may be referred to as "second level" navigation. In one or more embodiments, the second level navigation may use a "spare dimension" for visiting "sibling" entities.

Figure 16:
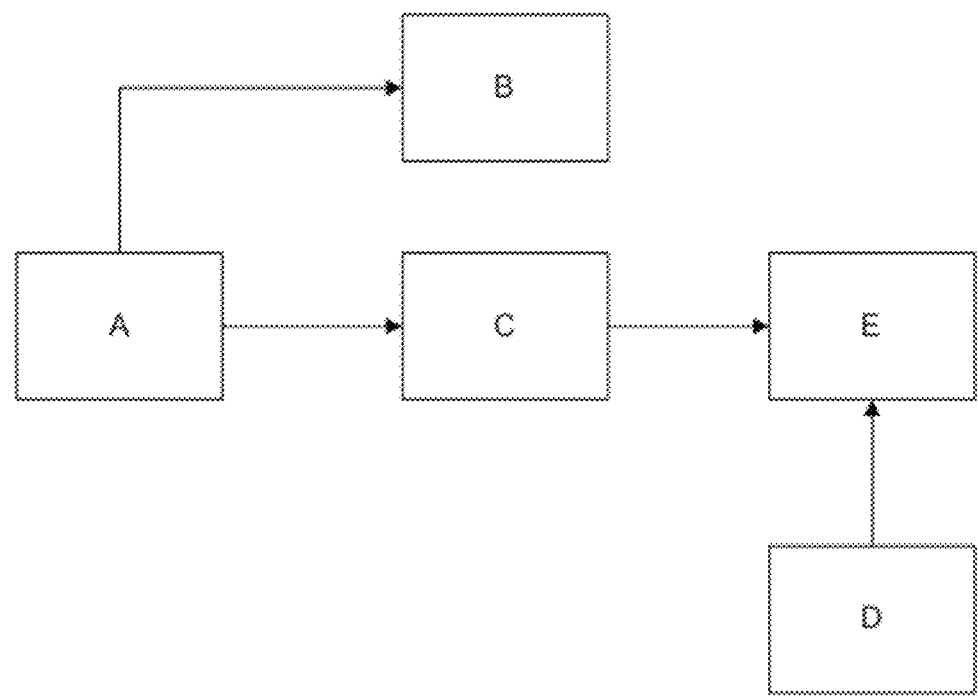
FIG. 16 illustrates another example process according to an embodiment.

FIG. 16 illustrates a model 1600 comprising entities A, B, C, D, E. As shown in FIG. 16, the entity A may have outgoing associations to B and C, respectively and the entity E may have incoming associations from C and D, respectively. In one embodiment, a crossing screen may be used for the outgoing associations of A and the incoming associations of E. In another embodiment, the second-level navigation may be used. The second-level navigation may keep track of which entity is currently focused and navigation history before reaching the current entity (e.g., from which former entity navigated to the currently focused entity). For instance, the entity C may be reached by traversing the outgoing association of A and also by tracing back the incoming connections of E. In the former case, a second dimension (also may be referred to as auxiliary dimension which is typically vertical) may be used for navigating to "sibling" entities. If A was the former entity, the sibling entity of C may be B; and if E was the former entity, the sibling entity of C may be D. By swiping vertically (if vertical is the auxiliary dimension), a user may use a shape flow view according to an embodiment to visit a sibling entity without going back to the former entity.

Figure 17:
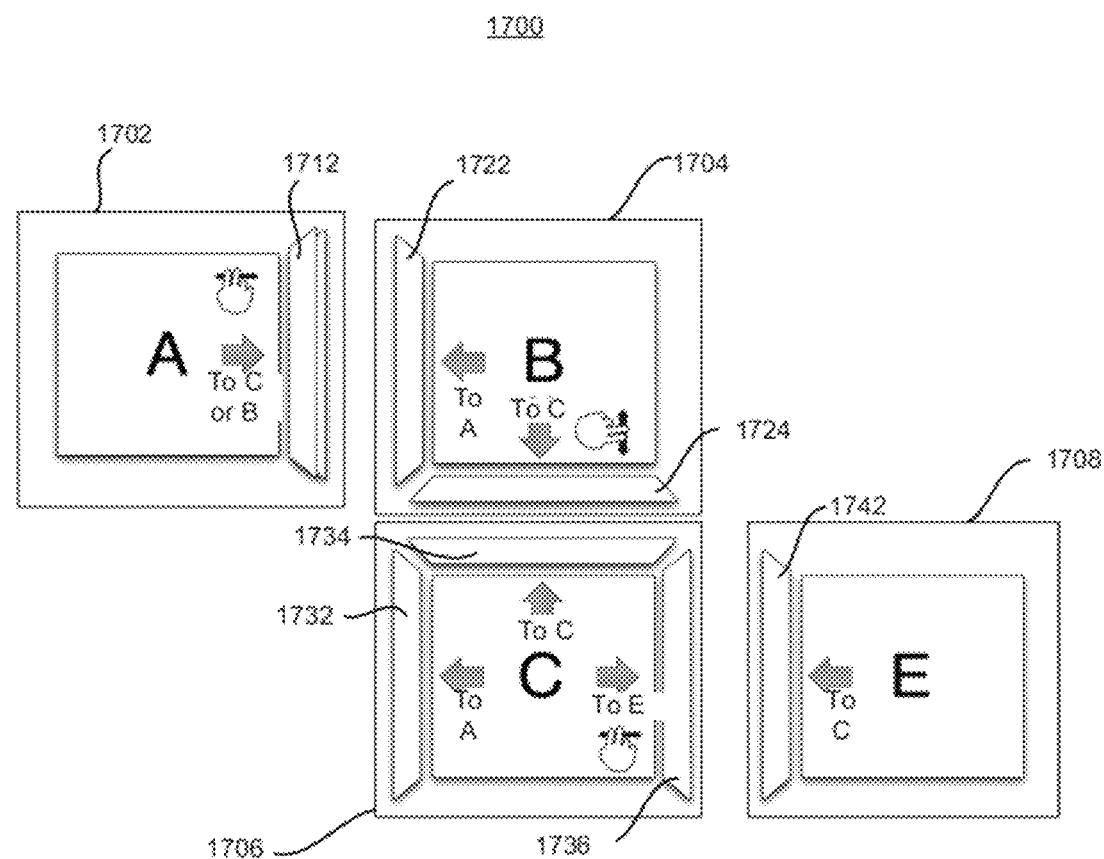
FIG. 17 illustrates another exemplary screen display for a mobile device according to an embodiment.

FIG. 17 illustrates an example navigation flow 1700 for second-level navigation according to an embodiment. The example navigation flow 1700 may comprise screen displays 1702, 1704, 1706 and 1708, representing displays in the model view area 222 of a mobile device for entities A, B, C and E of the model 1600 respectively. The screen display 1702 may comprise the entity A and a right stack of model entities 1712. The screen display 1704 may comprise the entity B, a left stack of model entities 1722 and a bottom stack of model entities 1724. The screen display 1706 may comprise the entity C, a left stack of model entities 1732, a top stack of model entities 1734 and a right stack of model entities 1736. The screen display 1708 may comprise the entity E and a left stack of model entities 1742.

As shown in FIG. 17, the navigation flow 1700 may start from the entity A of the screen display 1702 to the right stack of model entities 1712. In one embodiment, either of the entities A or B of the screen displays 1704 or 1706 may (non-deterministically) be chosen. As shown in FIG. 17, for example, the entity B of the screen display 1704 may be chosen. From the entity B of the screen display 1704 the navigation flow 1700 may move back to the entity A of the screen display 1702 (by swiping right) or move to a sibling entity of the entity B of the screen display 1704 (from the entity A of the screen display 1702's perspective) by swiping upwards, which may be the entity C of the screen display 1706. At the entity C of the screen display 1706, the navigation flow 1700 may either move back to the entity B of the screen display 1704 (swipe downwards), back to the entity A of the screen display 1702 (swipe right) or progress to the entity E of the screen display 1708 which is may be a successor of the entity C of the screen display 1706. After moving to the entity E of the screen display 1708 (by swiping left), the example process 1700 may move to a predecessor, for example the entity C of the screen display 1706 or the D entity of the model 1600 (not shown).

In one embodiment, when swiping right to navigate to a predecessor entity, users may expect to be taken back to the entity from which they reached the currently focused entity. For example, the entities B and C of the screen displays 1704 and 1706 may be sibling entities. If a user reaches entity E of the screen display 1708 by going this way: A→B→C→E. Although both C and D are predecessor entities of E, when swiping right at the entity E, at least one embodiment may go back to the entity C and shows the screen display 1706. In other words, the example process 1700 may depend on the predecessor entity (i.e., the entity navigated from) to determine the sibling entities. For that purpose, in one embodiment, the example process 1700 may keep track of the former entity. In another embodiment, the example process 1700 may keep the full history of previously visited entities which would not only allow determining the sibling entities in the current context but also allow "tracing back" an entire navigation path in the same way that the example process 1700 may have progressed to the current state. In one or more embodiments, regular browsing (forward navigation) and tracing back (i.e., backward navigation) may be distinguished. For example, moving from one entity to another may be a backward navigation if the target entity is a topmost entity in the navigation history and it is removed from there once the navigation moves back, otherwise, it is a forward navigation and the new entity may be added to the history. In one embodiment, the navigation history may function like a stack memory where entities may be added on top (in case of forward navigation) or removed (in case of backward navigation). By removing the top elements one by one from the stack, the entire path of navigating from one entity to another can be followed back in reverse order.

Second-level navigation may provide an elegant way of browsing a model that feels natural for sibling entities and does not require crossing screens. In one embodiment, a single type of associations may be used. However, in some cases, there are model fragments that may be disconnected from the rest of the model. In these cases, embodiments according to the present invention may mix spatial navigation with association-based navigation. For example, in one embodiment, when a "boundary entity" may be reached through association-based navigation (i.e., there are no incoming or outgoing associations pointing to other entities), a crossing screen may be used to offer moving to another model fragment. The isolated model fragments may be indicated by showing another collapsed/folded symbol (e.g., FIG. 13 may be used by replacing the two thumbnail images with symbols indicating isolated model fragments).

Figure 18:
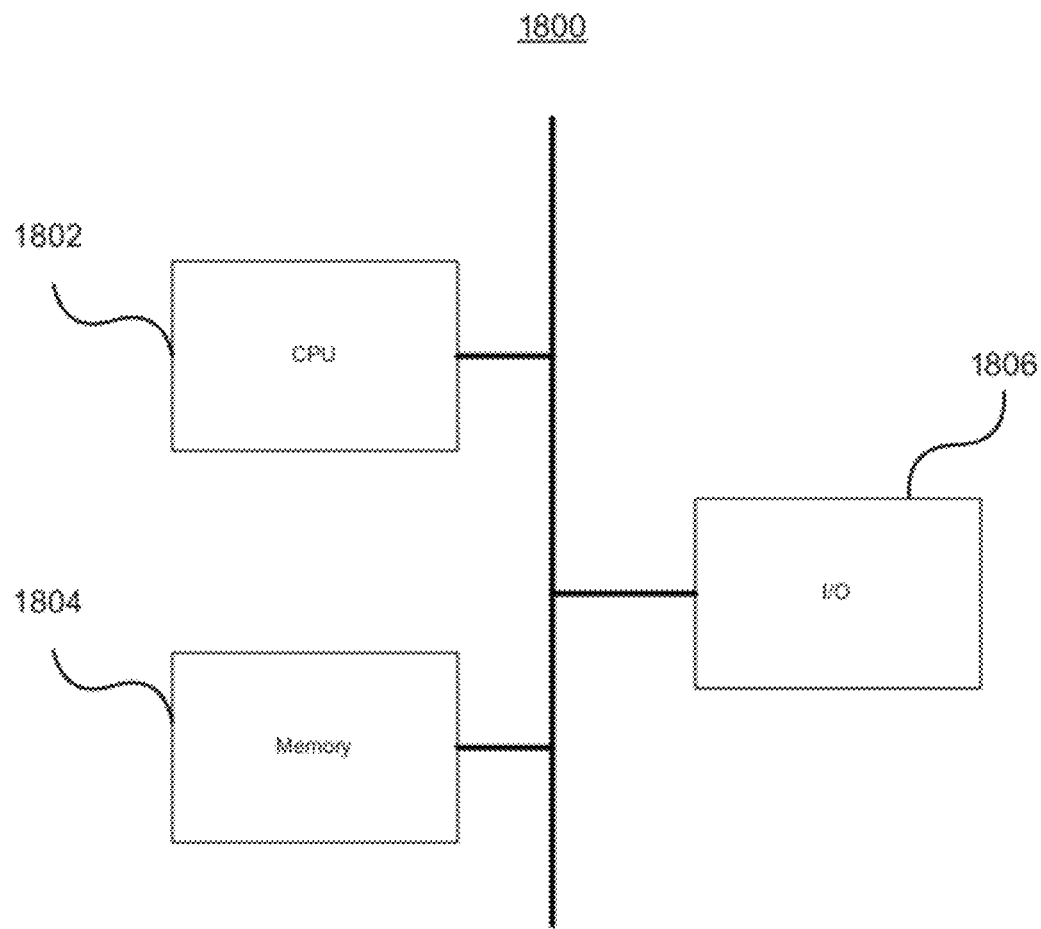
FIG. 18 illustrates an exemplary structure of hardware components for a mobile device according to an embodiment.

FIG. 18 depicts a structure of a computing device 1800 according to one embodiment of the invention. The computing device 1800 may includes a processor 1802, memory 1804, and an I/O device(s) 1806. The processor 1802 is connected to the memory 1804 and I/O device(s) 1806. These connections are direct or via other internal electronic circuitry or components.

The processor 1802 is a programmable processor that executes instructions residing in the memory 1804 to receive and send data via the I/O device(s) 1806. The instructions may perform the operations of the application context and rule based UI control described herein. The term programmable processor as used herein is any programmable microprocessor or processor or combination of microprocessors or processors that can operate on digital data, which may be special or general purpose processors coupled to receive data and instructions from, and to transmit data and instructions to, a machine-readable medium. According to one embodiment of the present invention processor 802 may be an Intel microprocessor or a mobile CPU.

Memory 1804 is a machine-readable medium that stores data that is processed by processor 1802. The term machine-readable medium as used herein is any addressable storage device that stores digital data including any computer program product, apparatus and/or device (e.g., a random access memory (RAM), read only memory (ROM), magnetic disc, optical disc, programmable logic device (PLD), tape, hard drives, RAID storage device, flash memory or any combination of these devices). This may include external machine-readable mediums that are connected to processor 1802 via one or more I/O device(s) 1806.

The I/O device(s) 1806 may include one or more input/output devices (e.g., a touch screen, a network adapter) and interfaces that receive and/or send digital data to and from an external device. Interfaces as used herein are any point of access to an external device where digital data is received or sent, including ports, buffers, queues, subsets thereof, or any other interface to an external device.

Embodiments of the present invention provide effective collaborative business process modeling tools. Those tools may offer a plurality of features, such as: 1) browse other people's contributions (model fragments, comments, attachments, etc.) and be notified of newly added contributions; 2) add, edit, and delete contributions, which entails writing comments, modeling process artifacts, uploading documents, etc.; 3) preserve the jointly crafted "model" (by storing it centrally for later re-use or by sending it to someone else through email); 4) re-arrange and associate contributions (e.g., by visually grouping them close to one another, drawing edges between them, etc.); and 5) smoothly integrate with tools (e.g., a BPMS modeling environment) used at later stages of the modeling process in order to provide holistic support. Moreover, in at least one embodiment, the tool's interaction patterns and visual appearance have been adapted to smaller screens of mobile devices, to take advantage of touch interaction and a number of sensors (e.g., GPS unit, camera, microphone, compass, gyroscope, etc.) may be built in on the mobile devices.

Embodiments of the present invention may also help to avoid costly coordination for synchronizing and aligning individual contributions among the project's participants and also may result in shorter time-to-market cycles for modeling projects. Further, quality of the process models may be improved through automatically peer-reviewed process models (all participants effectively work on the same model). Participants from different locations and different time zones can jointly model a single process in a Web browser-based interface In one or more embodiments, the "reach" of collaborative process modeling may be extended to mobile devices, although the mobile devices may suffer from some restrictions such as a limited screen size, less computing power, constrained network bandwidth, limited storage space, and may differ greatly in the way they are used (e.g., touch gestures vs. mouse clicks; turning phones to another orientation to make more space for screen controls; using the built-in gyroscope to translate the device's tilt and movement into commands, etc.). However, mobile devices are inexpensive, come with a number of built-in sensors (camera, microphone, GPS unit, etc.), are lightweight and, thus, convenient to carry along, and can access the Internet (including enterprise back-end systems through firewalls) from anywhere by dialing into mobile networks which cover much if not most of the world's surface. Furthermore, smartphones and touchpads have penetrated groups of users that were previously not necessarily able to productively work on these devices.

Embodiments of the present invention may provide the following benefits:

Support for meeting room situations in general where attendees may contribute to the jointly crafted process model by using their mobile phones without the need to bring along bulky devices (laptops, projector)

Being particularly well suited for "brainstorming" sessions where everyone can individually have his or her thoughts be added to the meeting minutes and also browse other attendees' contributions while still being engaged with the other attendees (i.e., using small, hand-held devices is typically less distracting and allows for maintaining eye contact to other attendees more easily)

Added support for initial project phases where participants first need to agree on their roles and to also align on the project's scope and objectives. Those tasks typically require some discussions that may happen during a face-to-face brainstorming session.

Off-site users (like some business partners in a remote location or travelling) can be easily involved. Those users will still be able to get the complete picture of what is discussed during the meeting (e.g., through audio and also by being able to browse the other attendees' contributions and adding own thoughts).

Most mobile devices come with sensors to capture information that is worth being added to the project (e.g., some photographed document, a map section of some GPS coordinates, audio recordings, etc.).

Collaboration-technology enabled projects may also be shared with non-involved participants by using collaboration features that are built into most mobile devices (e.g., sending the process diagram by email, sharing the meeting minutes on Twitter, etc.).

The exemplary method and computer program instructions may be embodied on a machine readable storage medium such as a computer disc, optically-readable media, magnetic media, hard drives, RAID storage device, and flash memory. In addition, a server or database server may include machine readable media configured to store machine executable program instructions. The features of the embodiments of the present invention may be implemented in hardware, software, firmware, or a combination thereof and utilized in systems, subsystems, components or subcomponents thereof. When implemented in software, the elements of the invention are programs or the code segments used to perform the necessary tasks. The program or code segments can be stored on machine readable storage media. The "machine readable storage media" may include any medium that can store information. Examples of a machine readable storage medium include electronic circuits, semiconductor memory device, ROM, flash memory, erasable ROM (EROM), floppy diskette, CD-ROM, optical disk, hard disk, fiber optic medium, or any electromagnetic or optical storage device. The code segments may be downloaded via computer networks such as Internet, Intranet, etc.

Although the invention has been described above with reference to specific embodiments, the invention is not limited to the above embodiments and the specific configurations shown in the drawings. For example, some components shown may be combined with each other as one embodiment, or a component may be divided into several subcomponents, or any other known or available component may be added. The operation processes are also not limited to those shown in the examples. Those skilled in the art will appreciate that the invention may be implemented in other ways without departing from the spirit and substantive features of the invention. For example, features and embodiments described above may be combined with and without each other. The present embodiments are therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A computer implemented method for presenting a Business Process Modeling Notation (BPMN) design model on a computing device, the method comprising:
   identifying, by a computer processor, a plurality of model entities, relationships among the model entities, and a distance proximity between the model entities, of the BPMN design model;
   grouping the identified entities into distinct clusters based on the identified relationships and the distance proximity between the model entities grouped into a same cluster;
   presenting, by the computer processor, a model view area to display a selected view of the design model on a display area of the computing device, the model view area including:
      a predetermined model entity displayed in the model view area,
      a plurality of stacks of entities representing model entities in a collapsed and folded way, and
      each stack including grouped entities from a specific cluster arranged along a boundary edge of the predetermined model entity displayed in the model view area with at least one of the stacks containing grouped entities from a same cluster as the predetermined model entity and at least one of the stacks containing grouped entities from a different cluster as the predetermined model entity; and
   replacing the predetermined model entity displayed in the model view area with a model entity in a stack arranged along a user selected boundary when the user navigates to the user selected boundary on the computing device.

2. The computer implemented method of claim 1, wherein the computing device is a mobile device that includes one of a smart phone and a personal digital assistant (PDA).

3. The computer implemented method of claim 1, wherein the relationships are identified based on a spatial relationship among the model entities arranged on a two-dimensional design diagram pane.

4. The computer implemented method of claim 1, wherein the relationships are identified based on at least one of control flow and message flow among the model entities in a process model.

5. The computer implemented method of claim 4, wherein neighboring model entities based on message flow are indicated in a vertical direction and neighboring model entities based on control flow are indicated in a horizontal direction.

6. The computer implemented method of claim 1, further comprising:
   providing a cursor entity associated with the predetermined model entity, wherein when a plurality of the model entities are displayed on a different computing device connected with the computing device, the cursor indicates the model entity currently in focus on the computing device.

7. The computer implemented method of claim 1, wherein the design model has a primary copy saved on a collaboration server and a local copy stored on the computing device.

8. The computer implemented method of claim 7, further comprising:
   presenting a toolbar with a plurality of action buttons on the display area of the computing device, the action buttons including a button to add a model entity, a button to delete a model entity, a search field to search for a particular model entity, and a button indicating a plurality of second level model actions are provided in a secondary screen.

9. The computer implemented method of claim 1, further comprising presenting a plurality of view options including a global view representing an overall view of the design model, and a grouped view representing a list view of the model entities based on group affiliations.

10. The computer implemented method of claim 9, wherein the grouped view presents a button to choose a grouping criterion and a button to choose an order criterion.

11. A computing device, comprising:
    a memory to store computer program instructions; and
    a processor configured to execute the computer program instructions to:
       identify a plurality of model entities, relationships among the model entities, and a distance proximity between the model entities, of a Business Process Modeling Notation design model;
       group the identified entities into distinct clusters based on the identified relationships and the distance proximity between the model entities grouped into a same cluster;
       present a model view area to display a selected view of the design model on a display area of the computing device, the model view area including:
          a predetermined model entity displayed in the model view area,
          a plurality of stacks of entities representing model entities in a collapsed and folded way, and
          each stack including grouped entities from a specific cluster arranged along a boundary edge of the predetermined model entity displayed in the model view area with at least one of the stacks containing grouped entities from a same cluster as the predetermined model entity and at least one of the stacks containing grouped entities from a different cluster as the predetermined model entity; and
       replace the predetermined model entity displayed in the model view area with a model entity in a stack arranged along a user selected boundary when the user navigates to the user selected boundary on the computing device.

12. The computing device of claim 11, wherein the computing device is a mobile device that includes one of a smart phone and a PDA.

13. The computing device of claim 11, wherein the relationships are identified based on a spatial relationship among the model entities arranged on a two-dimensional design diagram pane.

14. The computing device of claim 11, wherein the relationships are identified based on at least one of control flow and message flow among the model entities in a process model.

15. The computing device of claim 14, wherein neighboring model entities based on message flow are indicated in a vertical direction and neighboring model entities based on control flow are indicated in a horizontal direction.

16. The computing device of claim 11, wherein the processor is further configured to:

provide a cursor entity associated with the predetermined model entity, wherein when a plurality of the model entities are displayed on a different computing device connected with the computing device, the cursor indicates the model entity currently in focus on the computing device.

17. The computing device of claim 11, wherein the design model has a primary copy saved on a collaboration server and a local copy stored on the computing device.

18. The computing device of claim 17, wherein the processor is further configured to:
present a toolbar with a plurality of action buttons on the display area of the computing device, the action buttons including a button to add a model entity, a button to delete a model entity, a search field to search for a particular model entity, and a button indicating a plurality of second level model actions are provided in a secondary screen.

19. The computing device of claim 11, further comprising presenting a plurality of view options including a global view representing an overall view of the design model, and a grouped view representing a list view of the model entities based on group affiliations.

20. The computing device of claim 19, wherein the grouped view presents a button to choose a grouping criterion and a button to choose an order criterion.

21. A non-transitory computer-readable storage medium embodied with program instructions for causing a computing device to execute a method for presenting a Business Process Modeling Notation (BPMN) design model, the method comprising:
identifying, by a computer processor, a plurality of model entities, relationships among the model entities, and a distance proximity between the model entities, of the BPMN design model;
grouping the identified entities into distinct clusters based on the identified relationships and the distance proximity between the model entities grouped into a same cluster;
presenting, by the computer processor, a model view area to display a selected view of the design model on a display area of the computing device, the model view are including:
a predetermined model entity displayed in the model view area,
a plurality of stacks of entities representing model entities in a collapsed and folded way, and
each stack including grouped entities from a specific cluster arranged along a boundary edge of the predetermined model entity displayed in the model view area with at least one of the stacks containing grouped entities from a same cluster as the predetermined model entity and at least one of the stacks containing grouped entities from a different cluster as the predetermined model entity; and
replacing the predetermined model entity displayed in the model view area with a model entity in a stack arranged along a user selected boundary when the user navigates to the user selected boundary on the computing device.

22. The non-transitory computer-readable storage medium of claim 21, wherein the computing device is a mobile device that includes a smart phone or a PDA.

23. The non-transitory computer-readable storage medium of claim 21, wherein the relationships are identified based on a spatial relationship among the model entities arranged on a two-dimensional design diagram pane.

24. The non-transitory computer-readable storage medium of claim 21, wherein the relationships are identified based on control flow, message flow or both among the model entities in a process model.

25. The non-transitory computer-readable storage medium of claim 24, wherein neighboring model entities based on message flow are indicated in a vertical direction and neighboring model entities based on control flow are indicated in a horizontal direction.

26. The non-transitory computer-readable storage medium of claim 21, wherein the method further comprising:
providing a cursor entity associated with the predetermined model entity, wherein when a plurality of the model entities are displayed on a different computing device connected with the computing device, the cursor indicates the model entity currently in focus on the computing device.

27. The non-transitory computer-readable storage medium of claim 21, wherein the design model has a primary copy saved on a collaboration server and a local copy stored on the computing device.

28. The non-transitory computer-readable storage medium of claim 27, wherein the method further comprises:
presenting a toolbar with a plurality of action buttons on the display area of the computing device, the action buttons including a button to add a model entity, a button to delete a model entity, a search field to search for a particular model entity, and a button indicating a plurality of second level model actions are provided in a secondary screen.

29. The non-transitory computer-readable storage medium of claim 21, wherein the method further comprises presenting a plurality of view options including a global view representing an overall view of the design model, and a grouped view representing a list view of the model entities based on group affiliations.

30. The non-transitory computer-readable storage medium of claim 29, wherein the grouped view presents a button to choose a grouping criterion and a button to choose an order criterion.

31. The computer implemented method of claim 1, wherein the clusters are identified by a k-means clustering heuristics.

32. The computing device of claim 11, wherein the clusters are identified by a k-means clustering heuristics.

33. The non-transitory computer-readable storage medium of claim 21, wherein the clusters are identified by a k-means clustering heuristics.

* * * * *